United States Patent
Yasui

(10) Patent No.: US 6,741,398 B2
(45) Date of Patent: May 25, 2004

(54) ZOOM LENS SYSTEM, IMAGE PROJECTING AND IMAGE PICK-UP DEVICES USING THE SAME

(75) Inventor: Hiroto Yasui, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/022,556

(22) Filed: Dec. 13, 2001

(65) Prior Publication Data

US 2002/0131184 A1 Sep. 19, 2002

(30) Foreign Application Priority Data

Dec. 15, 2000 (JP) ........................................ 2000/382025

(51) Int. Cl.⁷ ............................................... G02B 15/14
(52) U.S. Cl. ........................................ 359/680; 359/676
(58) Field of Search .............................. 359/676, 679, 359/680, 681, 682, 683

(56) References Cited

U.S. PATENT DOCUMENTS

| | | | |
|---|---|---|---|
| 5,253,113 A | * 10/1993 | Sekita et al. ................ | 359/680 |
| 5,847,877 A | 12/1998 | Imamural et al. ........... | 359/566 |
| 6,122,104 A | 9/2000 | Nakai .......................... | 359/576 |
| 6,191,896 B1 | * 2/2001 | Itoh ............................. | 359/689 |
| 6,215,599 B1 | * 4/2001 | Ohtake ........................ | 359/688 |
| 6,450,648 B1 | * 9/2002 | Ohzawa et al. .............. | 353/70 |
| 2002/0027712 A1 | * 3/2002 | Soskind ....................... | 359/565 |

FOREIGN PATENT DOCUMENTS

| JP | 5-313066 | * 11/1993 |
|---|---|---|
| JP | 7-151971 | * 6/1995 |

OTHER PUBLICATIONS

U.S. patent application Ser. No. 10/028,095, Yasui et al., filed Oct. 25, 2001.

* cited by examiner

*Primary Examiner*—Georgia Epps
*Assistant Examiner*—William Choi
(74) *Attorney, Agent, or Firm*—Morgan & Finnegan, LLP

(57) ABSTRACT

There are provided a zoom lens system comprising, in order from a more distant conjugate point, a first lens unit of a negative refractive power, a second lens unit of negative refractive power which moves during zooming, third, fourth and fifth lens units, and at least one diffraction optical element.

31 Claims, 20 Drawing Sheets

LIQUID CRYSTAL PROJECTOR USING INVENTIVE ZOOM LENS SYSTEM

CAMERA USING INVENTIVE ZOOM LENS SYSTEM

ZOOM LENS SYSTEM, IMAGE PROJECTING AND IMAGE PICK-UP DEVICES USING THE SAME

BACKGROUND OF THE INVENTION

The present invention relates to zoom lens systems, and more particularly a zoom lens system suitable for a projection lens for magnifies and projecting an original image formed by an image-forming device, such as a liquid crystal panel. The present invention is suitable, for example, for a zoom lens system including five lens units or more and using a diffraction optical element.

Along with recent increasingly improved fine and miniature liquid crystal projectors, a projection optical system for use with the liquid crystal projectors is required to exhibit higher performance. In particular, a strict requirement has currently applied to a correction to the transverse or lateral chromatic aberration, which dominantly controls the image quality.

Various optical systems have conventionally been proposed as a solution for the above problem. Recently, a diffraction optical element having a diffractive operation has been proposed as a means for correcting the chromatic aberration, in particular, the lateral chromatic aberration for use with the projection optical system.

For example, Japanese Laid-Open Patent Application No. 2000-19400 proposes a zoom lens system that uses a diffraction optical element for the zoom lens system for a projection in a liquid crystal projector. The zoom lens system includes, in order from a more distant conjugate point for a zoom lens system, a first lens unit of negative refractive power, a second lens unit of positive refractive power, a third lens unit of negative refractive power, and a fourth lens unit of positive refractive power, and a fifth lens unit of positive refractive power, and introduces a diffraction optical element into the zoom lens system. This prior art provides, when properly arranging the diffraction optical element in the zoom lens system, a zoom lens system with reduced astigmatism and distortion, which is so compatible with a fine liquid crystal that it may sufficiently correct the lateral chromatic aberration.

However, Japanese Laid-Open Patent Application No. 2000-19400 cannot sufficiently reduce a moving amount of the second unit as a zooming unit from the less distant conjugate point to the more distant conjugate point during zooming from a wide-angle end to a telephoto end, thus is disadvantageous in that the entire lens system does not have a sufficiently reduced size.

BRIEF SUMMARY OF THE INVENTION

Accordingly, it is a primary but exemplified object of the present invention to provide a zoom lens system suitable for a projection lens in a liquid crystal projector etc., which may correct a wide variety of aberrations including the chromatic aberration (in particular, the lateral chromatic aberration), while miniaturizing the entire lens system sufficiently.

In order to achieve the above object, a zoom lens system of one aspect according to the present invention includes, in order from a more distant conjugate point for the zoom lens system, a first lens unit of a negative refractive power, a second lens unit of negative refractive power which moves during zooming, third, fourth and fifth lens units, wherein said zoom lens system further includes at least one diffraction optical element. The zoom lens system is a system for arranging two conjugate points in a conjugate relationship. This zoom lens corrects, when properly arranging the diffraction optical element, a wide variety of aberrations including the chromatic aberration (in particular, lateral the chromatic aberration), while miniaturizing the entire lens system sufficiently.

Preferably, the third, fourth, and fifth lens units have positive, negative and positive refractive power.

The zoom lens system may further include a sixth lens unit, wherein the fifth lens unit moves during the zooming.

The zoom lens system may further include a sixth lens unit of positive refractive power.

The zoom lens system may further include a stop movable during zooming. The zoom lens system may further include stop between the third and forth lens units. The stop may move with the third lens unit. The diffraction optical element may be located closer to a less distant conjugate point than the stop. Thereby, the axial and lateral chromatic aberrations can be simultaneously corrected.

The diffraction optical element may be located in the fifth lens unit, thereby preventing lowered diffraction efficiency caused by an angular difference relative to a tangential direction at each incident position on a lens surface of each of the axial and non-axial rays as well as the deteriorated diffractive optical element at the outermost lens surface due to the dust and heat from a light source.

A conditional expression $-0.50 < fw/f1 < -0.01$ is preferably satisfied where f1 is a focal length of the first lens unit and fw is a focal length of the entire system at a wide-angle end. In this conditional expression, when the ratio exceeds the lower limit, the negative refractive power of the first lens unit becomes excessively strong, and the curvature of field is undesirably generated at an excessive side. On the other hand, when the ratio exceeds the upper limit, the negative refractive power of the first lens unit becomes excessively weak. Thereby, it becomes difficult to provide the entire system with a short focal length, and undesirably causes a long projection length to project an image.

The fourth lens unit moves from the more distant conjugate point to the less distant conjugate point during zooming from the wide-angle end to the telephoto end.

A conditional expression $0.05 < d3W/d3T < 0.60$ is preferably satisfied where d3W is a separation between the third and fourth lens units at the wide-angle end and d3T is a separation between the third and fourth lens units at the telephoto end. When the ratio exceeds the upper limit, the entire lens system and thus the back diameter undesirably increase. When the ratio exceeds the lower limit, a position of an exit pupil undesirably drastically fluctuates during zooming.

The second lens unit preferably moves from the more distant conjugate point to the less distant conjugate point during zooming from the wide-angle end to the telephoto end.

A conditional expression $0.05 < |M2/M4| < 1.0$ is satisfied where M2 is a moving amount of the second lens unit during zooming from the wide-angle end to the telephoto end, and M4 is a moving amount of the fourth lens unit during zooming from the wide-angle end to the telephoto end. In this conditional expression, when the ratio exceeds the upper limit, the front diameter becomes undesirably large. When the ratio exceeds the lower limit, the predetermined zooming ratio cannot be undesirably maintained.

A conditional expression $0.01 < |M3/M4| < 1.0$ is satisfied where M3 is a moving amount of the third lens unit during zooming from the wide-angle end to the telephoto end, and M4 is a moving amount of the fourth lens unit during zooming from the wide-angle end to the telephoto end. In this conditional expression, when the ratio exceeds the upper limit, the lens span becomes undesirably long. When the ratio exceeds the lower limit, a predetermined zooming ratio cannot be undesirably maintained.

Preferably, the lens units at both ends do not move during zooming from the wide-angle end to the telephoto end.

Preferably, the second lens unit includes one positive lens and one negative lens, or only one negative lens. Preferably, the third lens unit includes one positive lens. Preferably, the fourth lens unit includes one negative lens.

Preferably, the first lens unit includes, in order from the more distant conjugate point, three lenses of a positive lens, a negative lens and a negative lens, or a positive lens, a positive lens and a negative lens.

Preferably, the diffraction optical element includes one diffraction grating so as to enhance the diffraction efficiency of the diffraction light near a designed order or stacked layers of diffraction gratings so as to enhance the optical performance (or diffraction efficiency).

The diffraction optical element is formed by combining two diffraction gratings having the same grating thickness and facing each other so as to make flat a surface of the diffraction optical element. Such a diffraction optical element's surface as does not form a grating shape facilitates assembly work of the diffraction optical element, and provides a dustproof and inexpensive optical system.

The diffraction optical element may be formed by combining a plurality of diffraction gratings or a plurality of diffraction gratings facing each other via air.

An image-forming device of another aspect of the present invention includes the above zoom lens system and projects an original image to a subject surface, the image being located at the less distant conjugate position for the zoom lens system. The original image is a liquid crystal panel.

An image pick-up device of still another aspect of the present invention includes the above zoom lens, and uses the zoom lens system to project an image of an object onto a photosensitive body located at a less distant conjugate position for the zoom lens system.

Other objects and further features of the present invention will become readily apparent from the following description of preferred embodiments with reference to accompanying drawings.

DETAILED DESCRIPTION OF THE PREFERRED EMBODIMENTS

Figure 1:
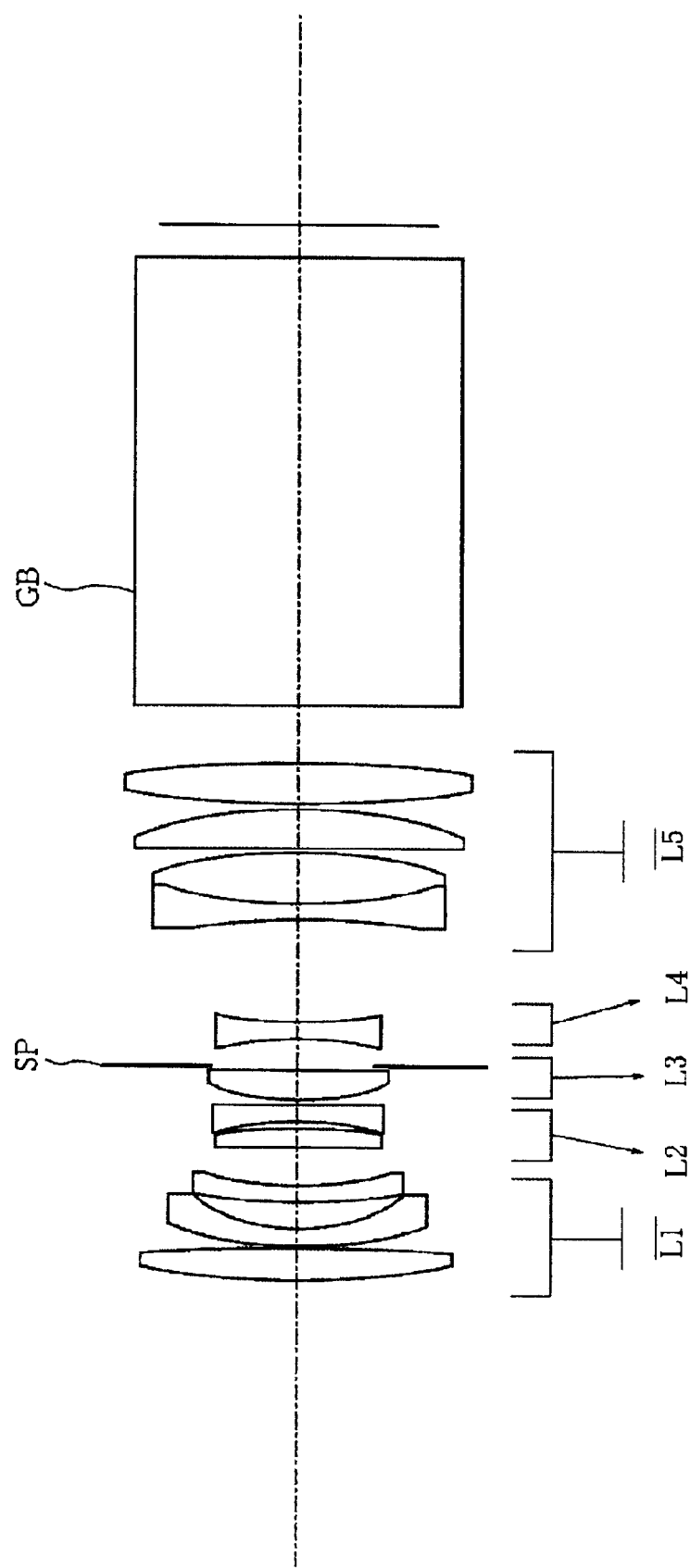
FIG. 1 shows lens sectional view of numerical example 1 according to the present invention.

A description will now be given of a zoom lens system of one aspect of the present invention, with reference to accompanying drawings. The inventive zoom lens system has a wide variety of applications in addition to the embodiment described in this disclosure. Here, a description will now be given of an embodiment that applies the zoom lens system according to the present invention to a projection optical system in a liquid crystal projector. Next follows a description of characteristics common to all the embodiments.

In order to realize the inventive zoom lens system, it is preferable to satisfy the following conditional expression:

$$-0.50 < fw/f1 < -0.01 \tag{1}$$

where f1 is a focal length of the first lens unit and fw is a focal length of the entire system at a wide-angle end.

The equation (1) relates to a relationship between a focal length of the entire system and the focal length of the first lens unit. When this ratio exceeds the lower limit in the equation (1), the negative refractive power of the first lens unit becomes excessively strong, and the curvature of field is undesirably generated at an excessive side. On the other hand, when the ratio exceeds the upper limit in the equation (1), the negative refractive power of the first lens unit becomes excessively weak. Thereby, it becomes difficult to provide the entire system with a short focal length, undesirably causing a long projection length in projecting an image.

Preferably, the following conditional expression is satisfied:

$$-1.0 < fw/f2 < -0.10 \tag{2}$$

where fw is a focal length of the entire system at a wide-angle end and f2 is a focal length of the second lens unit.

The equation (2) relates to a relationship between a focal length of the entire system and the focal length of the second lens unit. When this ratio exceeds the lower limit in the equation (2), the negative refractive power of the second lens unit becomes too strong, and the refractive power should be made associatively strong for each of the other lens units. This is advantageous to a miniaturized lens system, but results in increased aberrations in respective lens units and thus a difficulty in correcting them while catching their balances. When this ratio exceeds the upper limit in the equation (2), the negative refractive power of the second lens unit becomes excessively weak. Thereby, the moving amount of each lens unit increases accompanying with zooming, undesirably resulting in a longer lens span and a larger lens diameter.

Preferably, the following conditional expression is satisfied:

$$0.50 < fw/f3 < 1.5 \tag{3}$$

where fw is a focal length of the entire system at a wide-angle end and f3 is a focal length of the third lens unit.

The equation (3) relates to a relationship between a focal length of the entire system and the focal length of the third lens unit. When this ratio exceeds the lower limit in the equation (3), the negative refractive power of the second lens unit becomes excessively weak. Thereby, the moving amount of each lens unit increases accompanying with zooming, undesirably resulting in a longer lens span and a larger lens diameter. On the other hand, when this ratio exceeds the upper limit in the equation (3), the refractive power of the third lens unit becomes too strong, providing the miniaturized entire lens system. However, this results in increased spherical and other aberrations in the third lens unit and thus a difficulty in using other lens units to correct them.

It is desirable to satisfy the following conditional expression in order to obtain a good optical performance over the entire zooming range:

$$0.05 < d3W/d3T < 0.60 \tag{4}$$

where d3W is a separation between the third and fourth lens units at the wide-angle end and d3T is a separation between the third and fourth lens units at the telephoto end.

The equation (4) relates to separations between the third and fourth lens units at the wide-angle and the telephoto ends. In this equation, the ratio exceeding the upper limit would undesirably increase the entire lens system and thus the back diameter, whereas the ratio exceeding the lower limit would undesirably fluctuate a position of an exit pupil drastically.

Preferably, the following conditional expression is satisfied so as to improve the optical performance:

$$1.0 < d1W/d1T < 3.0 \tag{5}$$

where d1W is a separation between the first and second lens units at the wide-angle end and d1T is a separation between the first and second lens units at the telephoto end.

The equation (5) relates to separations between the first and second lens units at the wide-angle and telephoto ends. In this equation, when the ratio exceeding the upper limit would undesirably increase the lens span, whereas the ratio exceeding the lower limit would undesirably increase the front diameter.

In order to miniaturize the lens span while satisfying the above good optical performance, an absolute value of a moving amount in each unit needs to satisfy the following conditional expression during zooming from the wide-angle end to the telephoto end:

$$0.05 < |M2/M4| < 1.0 \tag{6}$$

where M2 is a moving amount of the second lens unit during zooming from the wide-angle end to the telephoto end, and M4 is a moving amount of the fourth lens unit during zooming from the wide-angle end to the telephoto end.

The equation (6) relates to moving amounts of the second and fourth lens units along with zooming. In this equation, the ratio exceeding the upper limit in the equation (6) would undesirably increase the front diameter, whereas the ratio exceeding the lower limit could not undesirably maintain a predetermined zooming ratio.

The following conditional expression would result in the further miniaturized lens span:

$$0.01 < |M3/M4| < 1.0 \tag{7}$$

where M3 is a moving amount of the third lens unit during zooming from the wide-angle end to the telephoto end, and M4 is a moving amount of the fourth lens unit during zooming from the wide-angle end to the telephoto end.

The equation (7) relates to moving amounts of the third and fourth lens units along with zooming. In this equation, the ratio exceeding the upper limit would result in the undesirably long lens span, whereas the ratio exceeding the lower limit could not undesirably maintain a predetermined zooming ratio.

Figure 2:
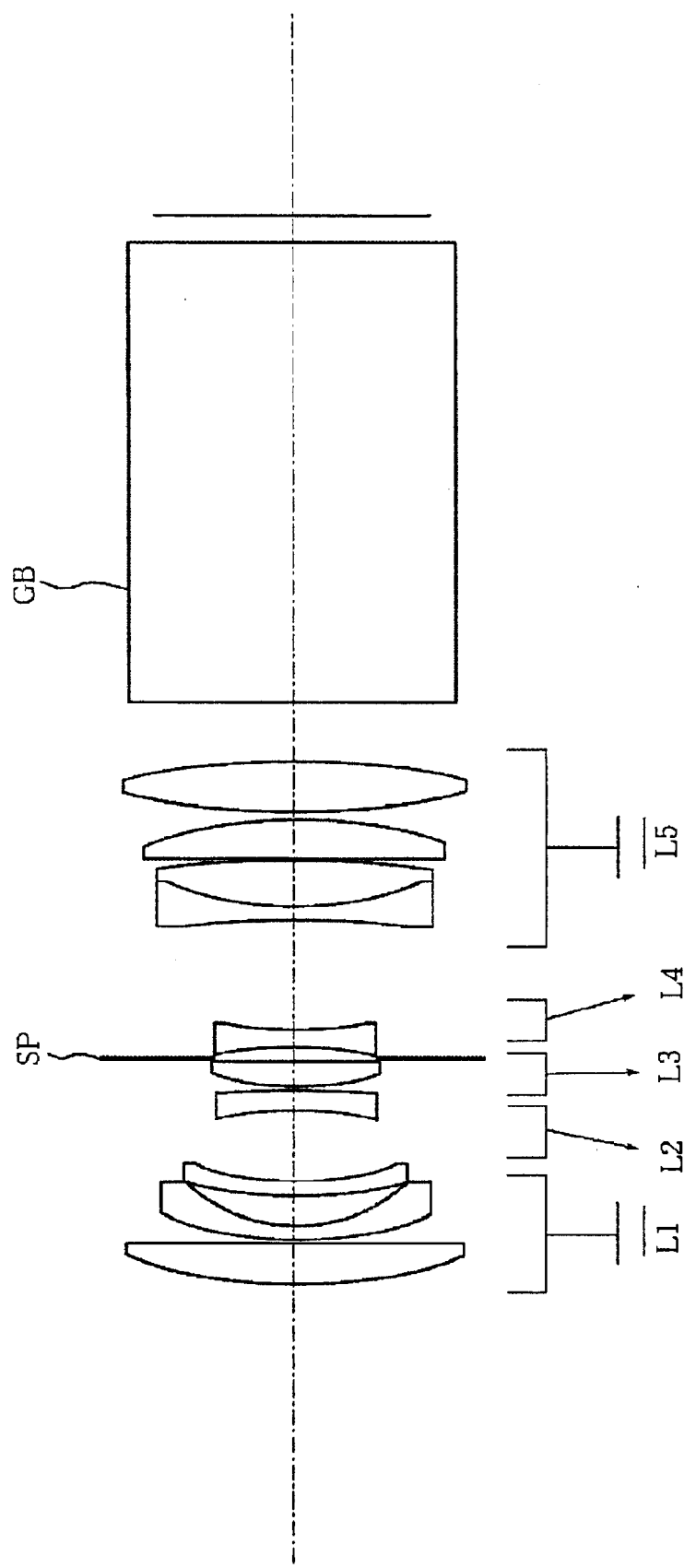
FIG. 2 shows lens sectional view of numerical example 2 according to the present invention.
Figure 3:
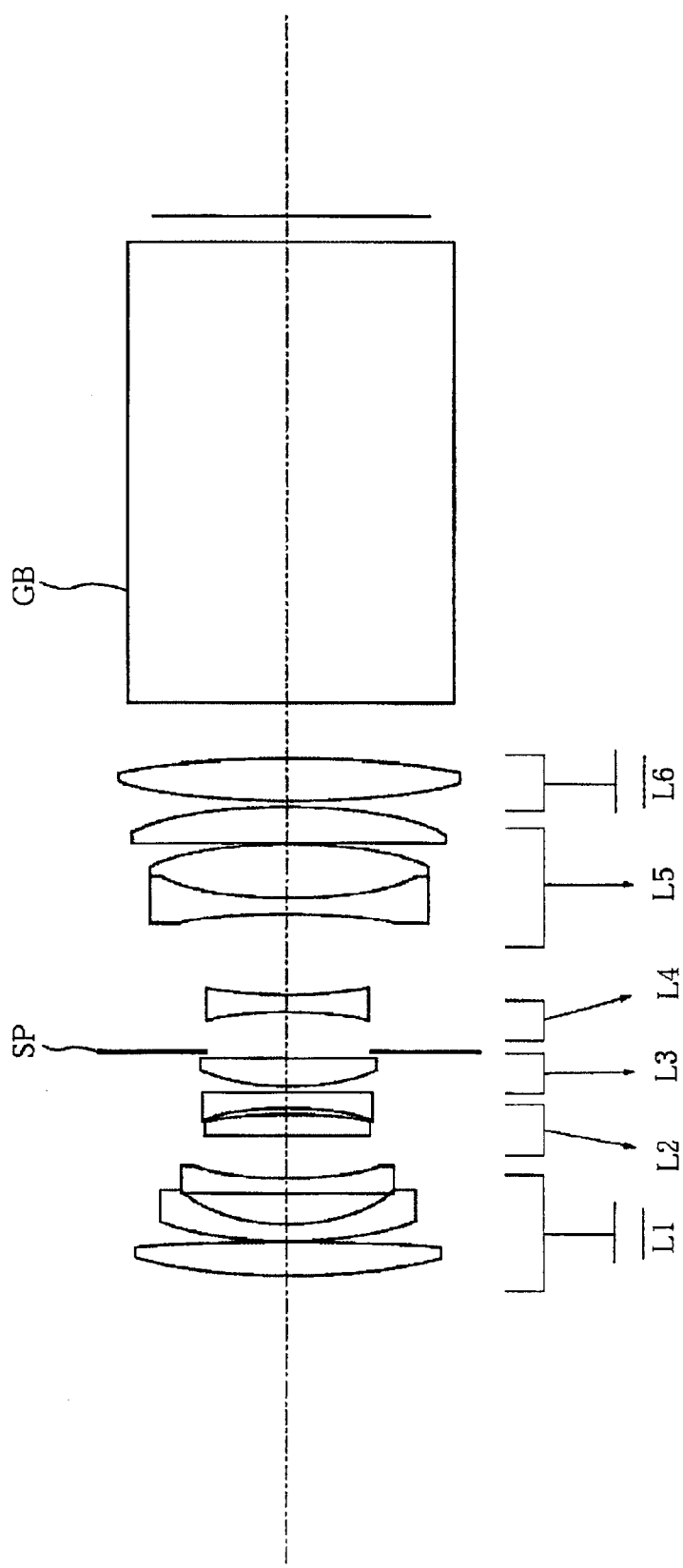
FIG. 3 shows lens sectional view of numerical example 3 according to the present invention.
Figure 4:
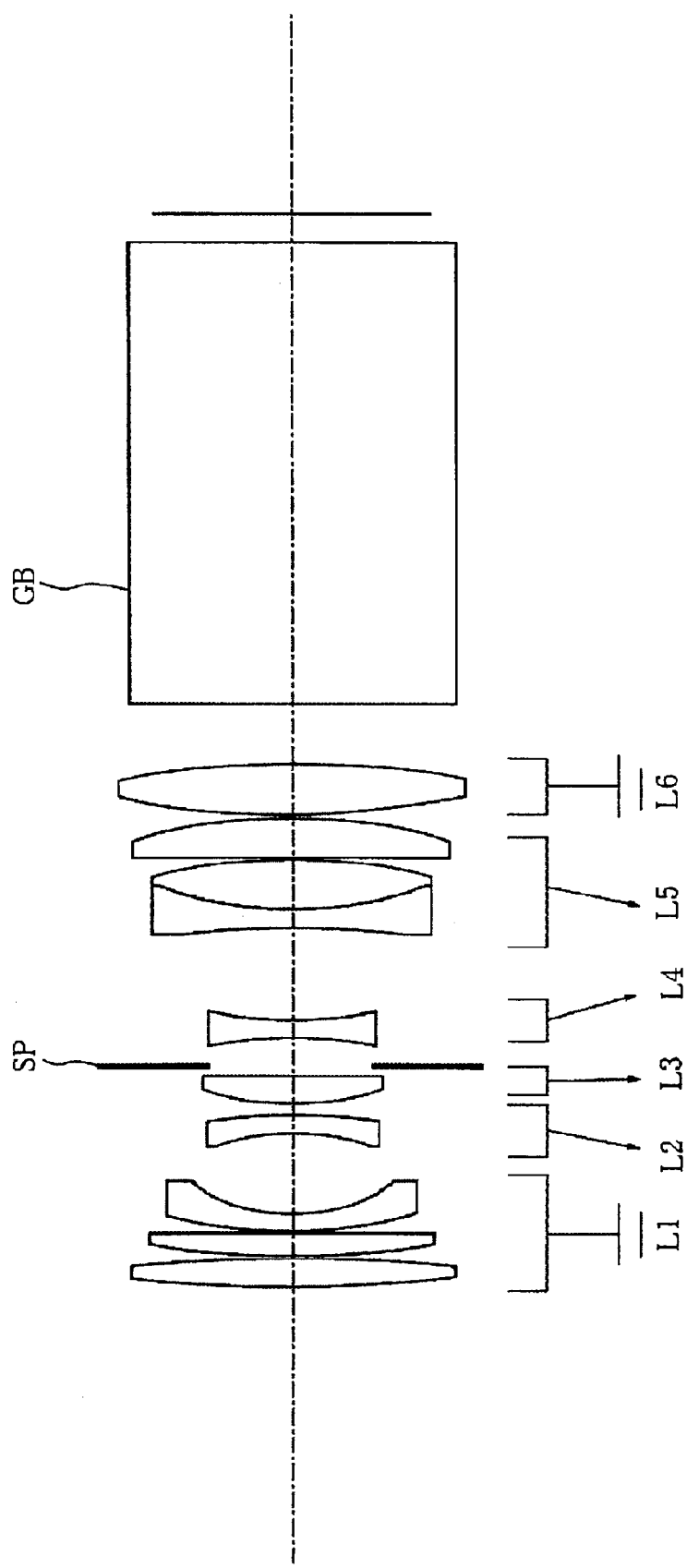
FIG. 4 shows lens sectional view of numerical example 4 according to the present invention.
Figure 5:
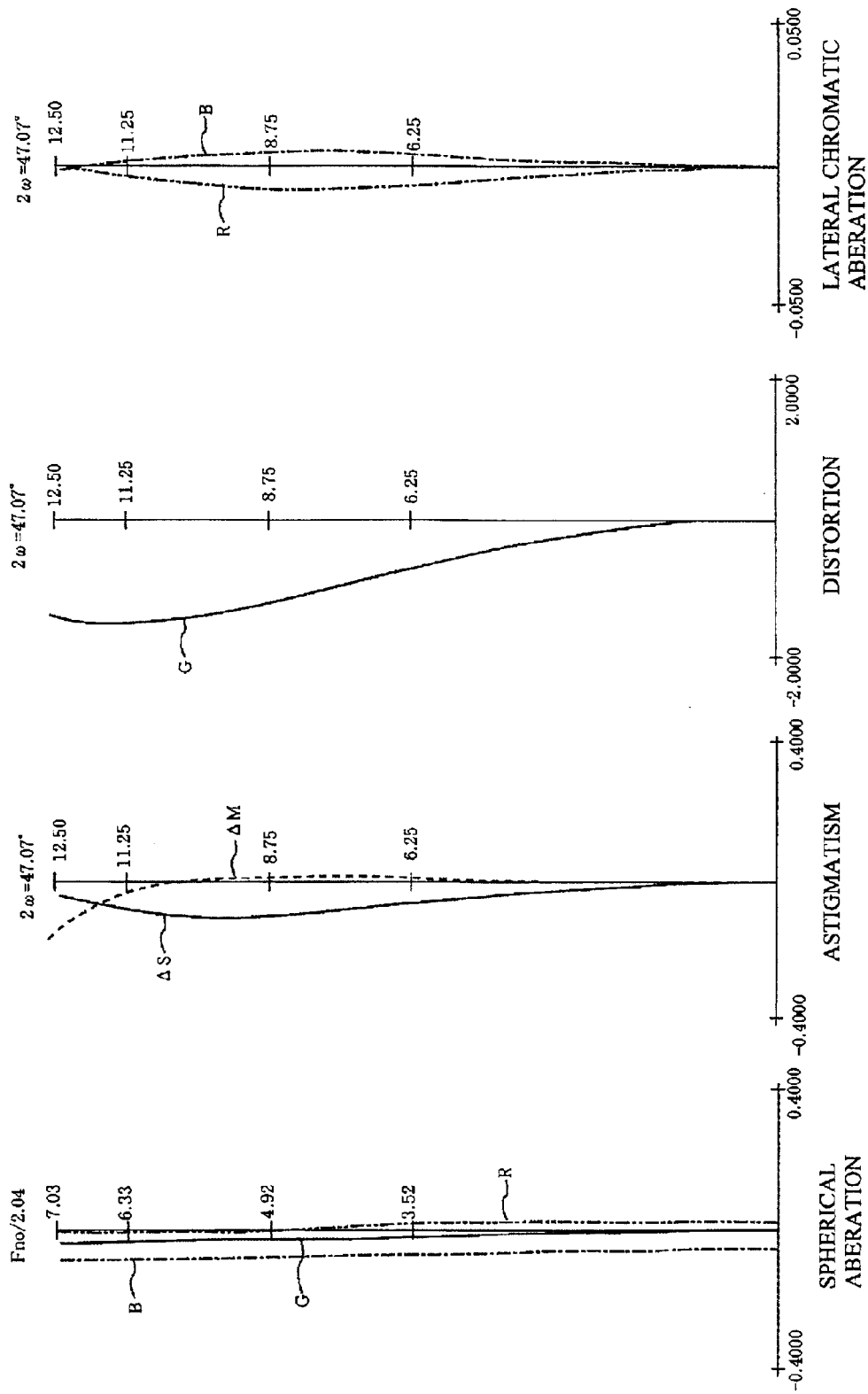
FIG. 5 shows graphic representations of aberrations at a wide-angle end of the numerical example 1 according to the present invention.
Figure 6:
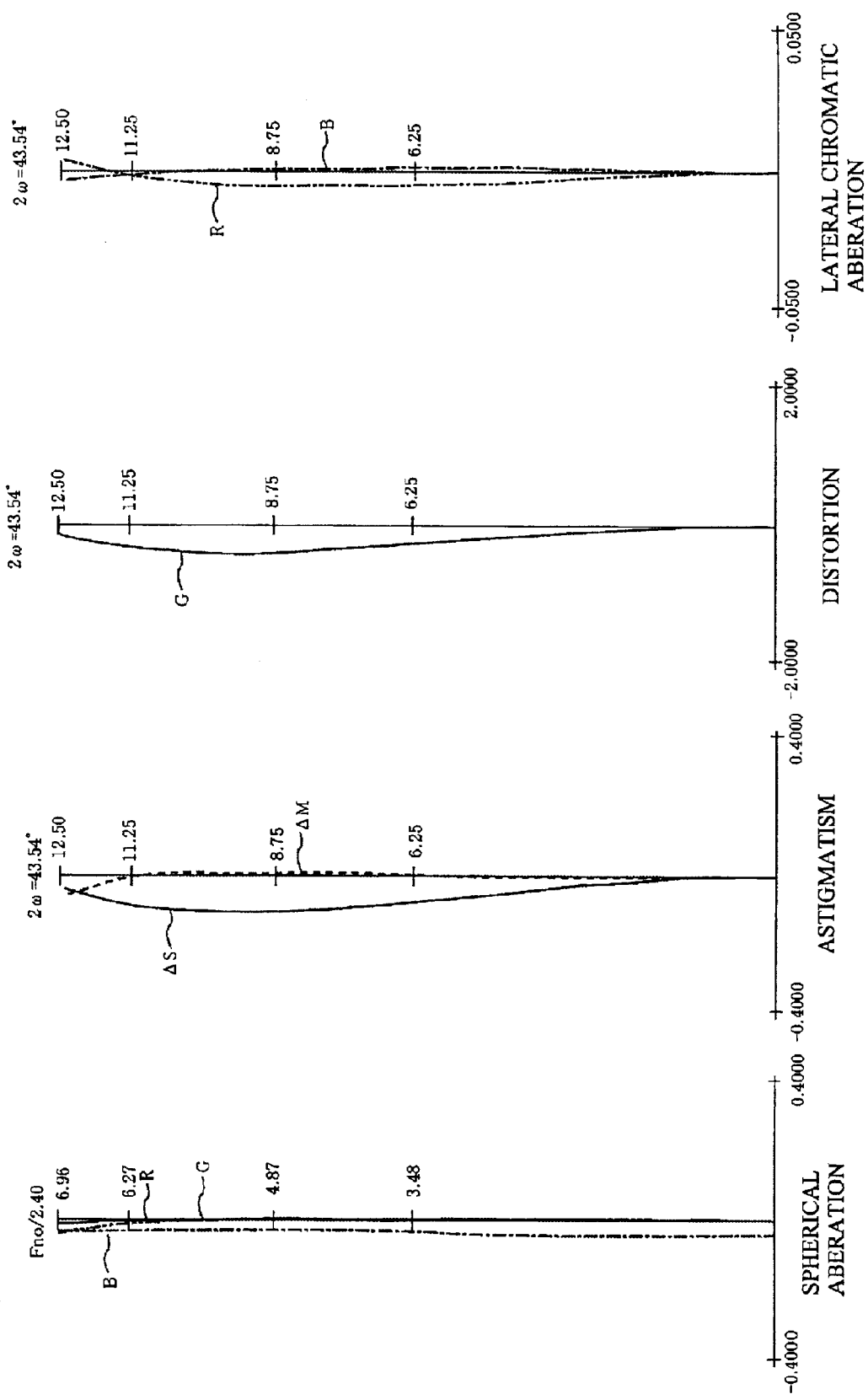
FIG. 6 shows graphic representations of aberrations at an intermediate position of the numerical example 1 according to the present invention.
Figure 7:
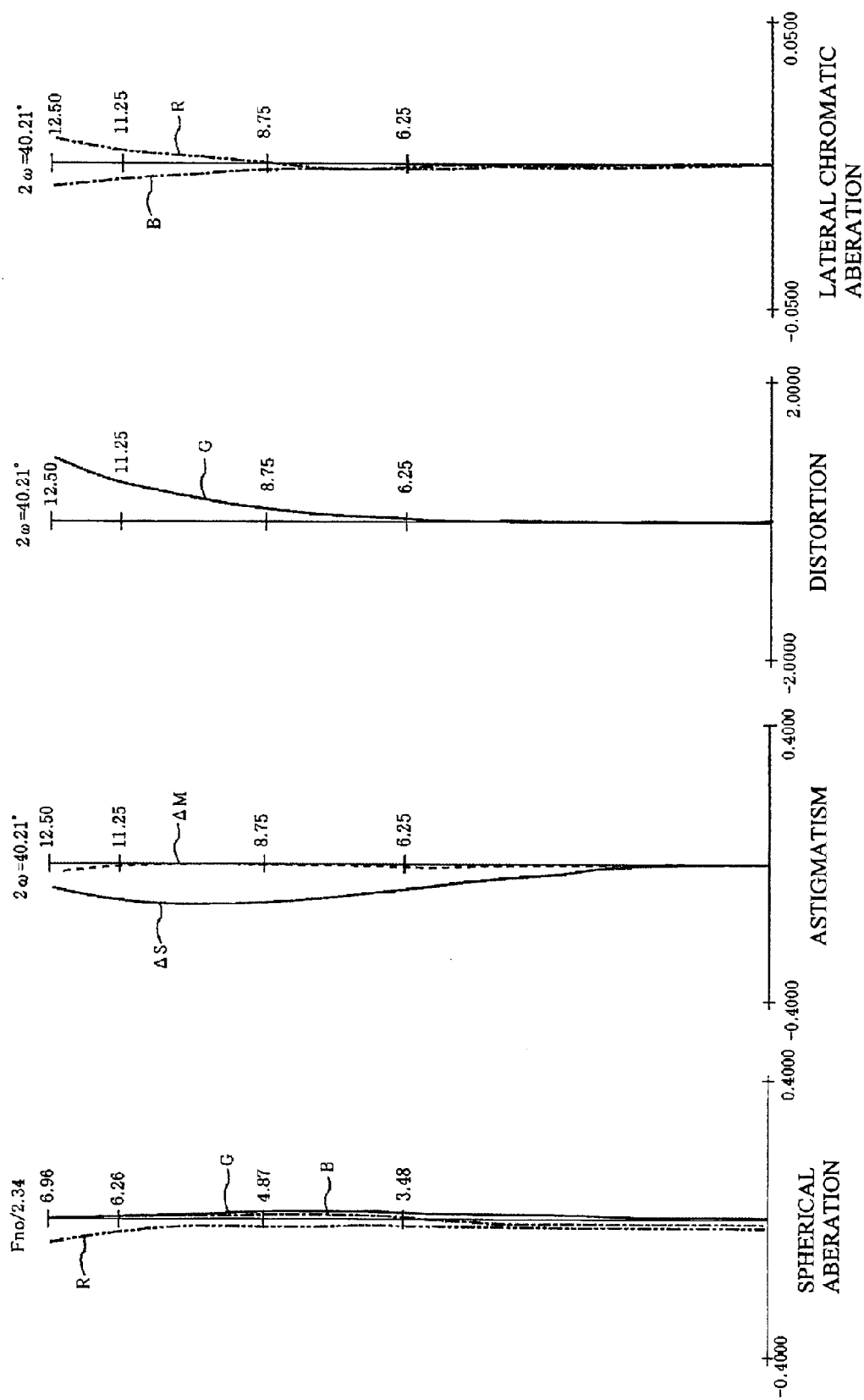
FIG. 7 shows graphic representations of aberrations at a telephoto end of the numerical example 1 according to the present invention.
Figure 8:
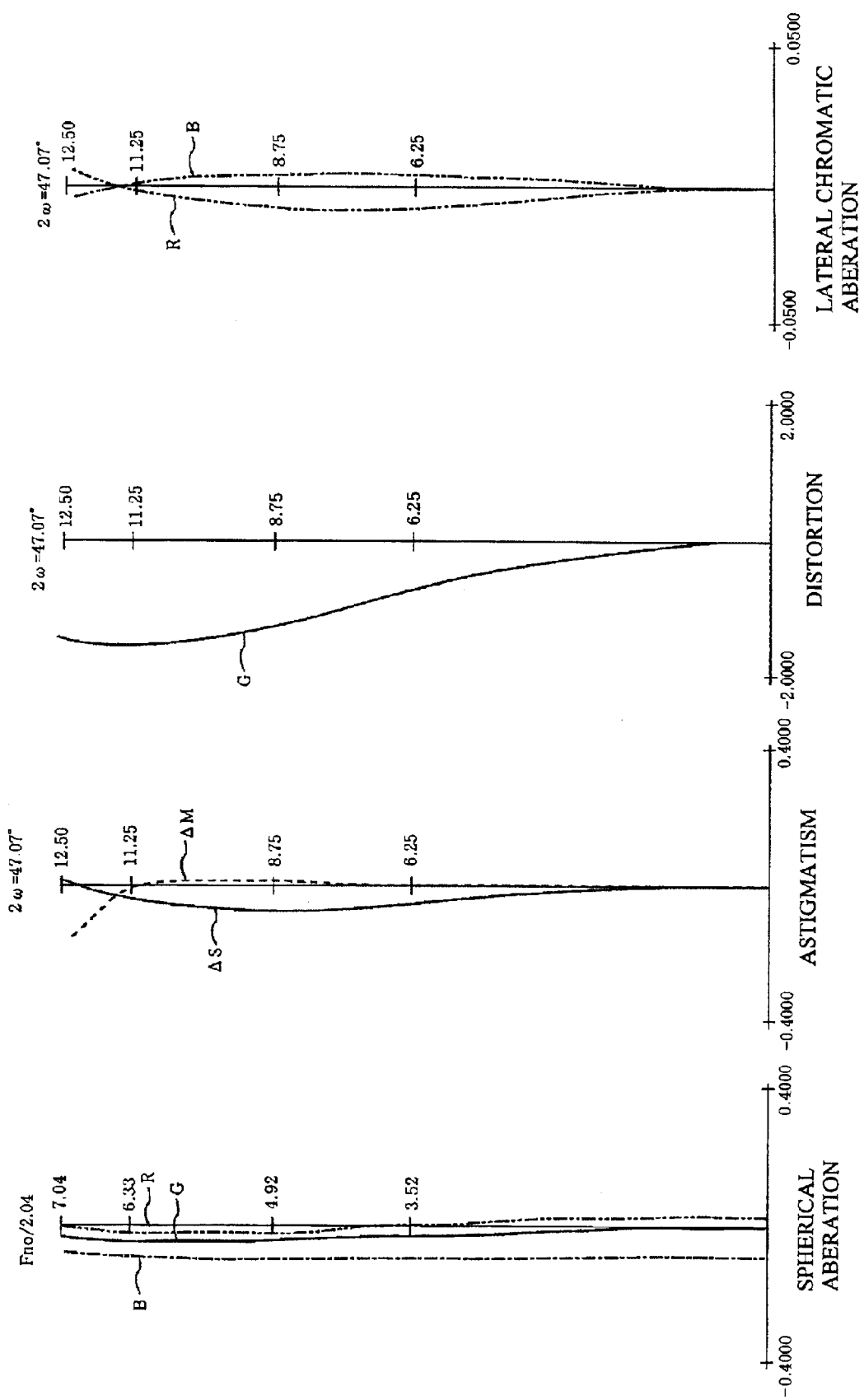
FIG. 8 shows graphic representations of aberrations at the wide-angle end of the numerical example 2 according to the present invention.
Figure 9:
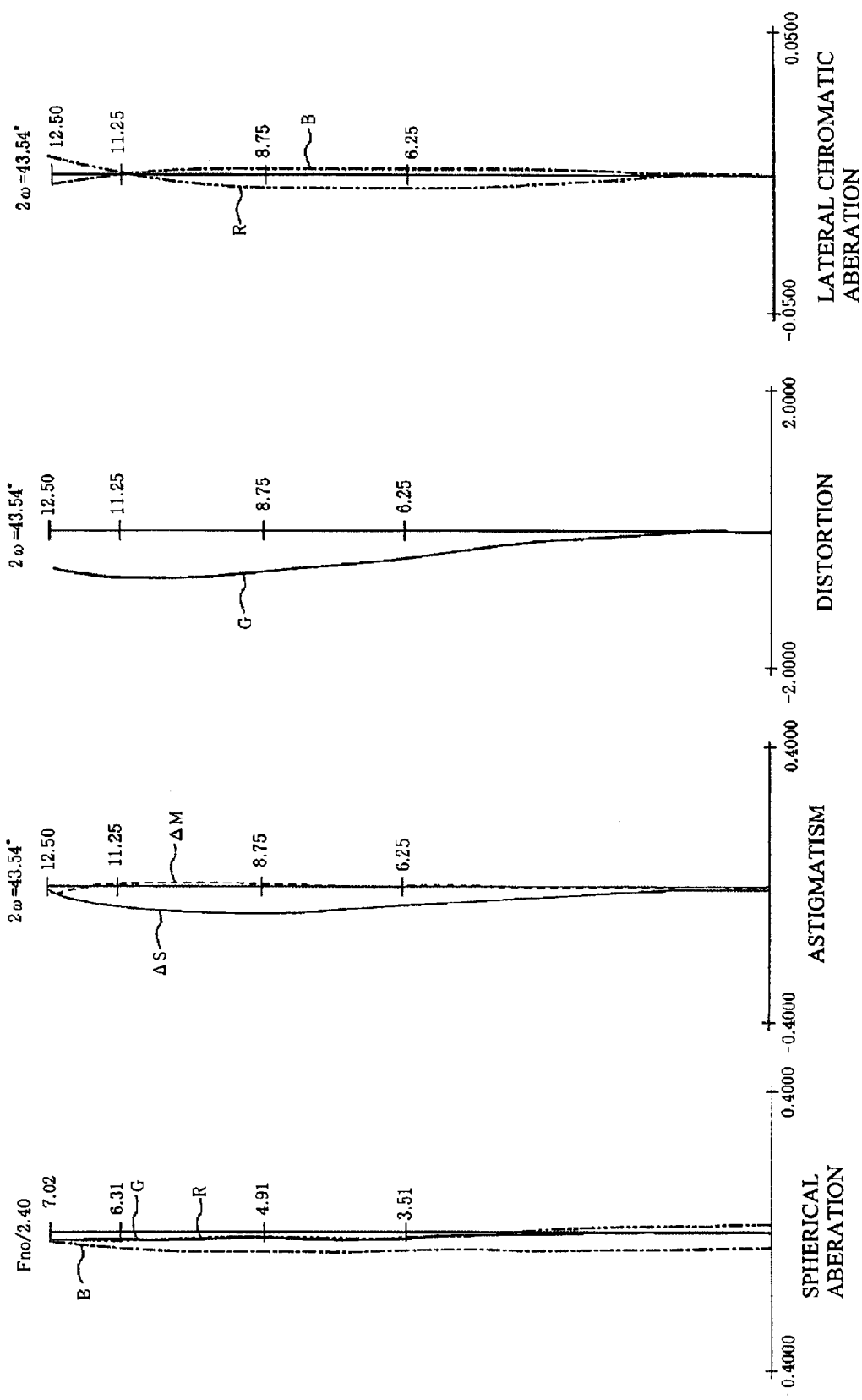
FIG. 9 shows graphic representations of aberrations at the intermediate position of the numerical example 2 according to the present invention.
Figure 10:
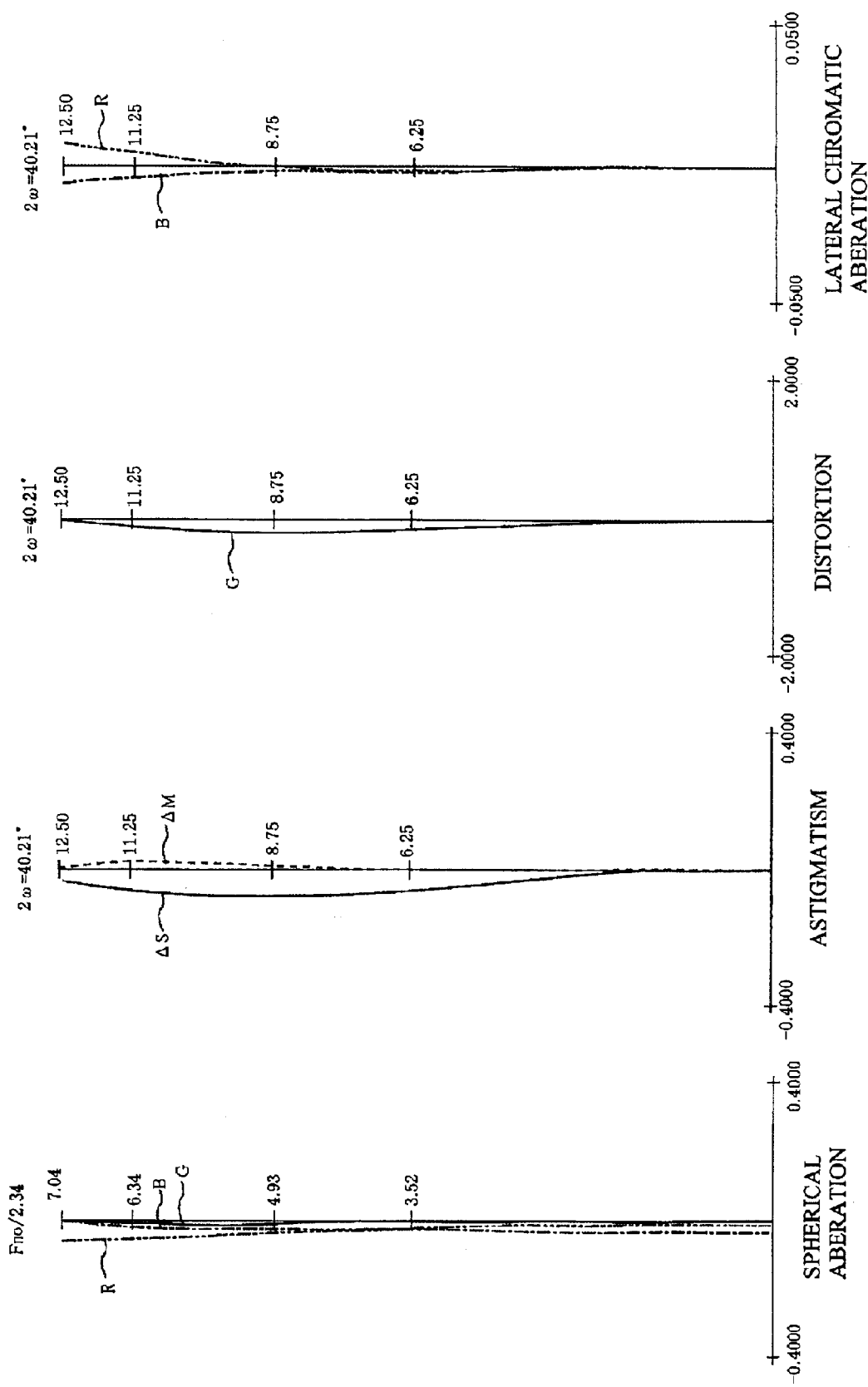
FIG. 10 shows graphic representations of aberrations at the telephoto end of the numerical example 2 according to the present invention.
Figure 11:
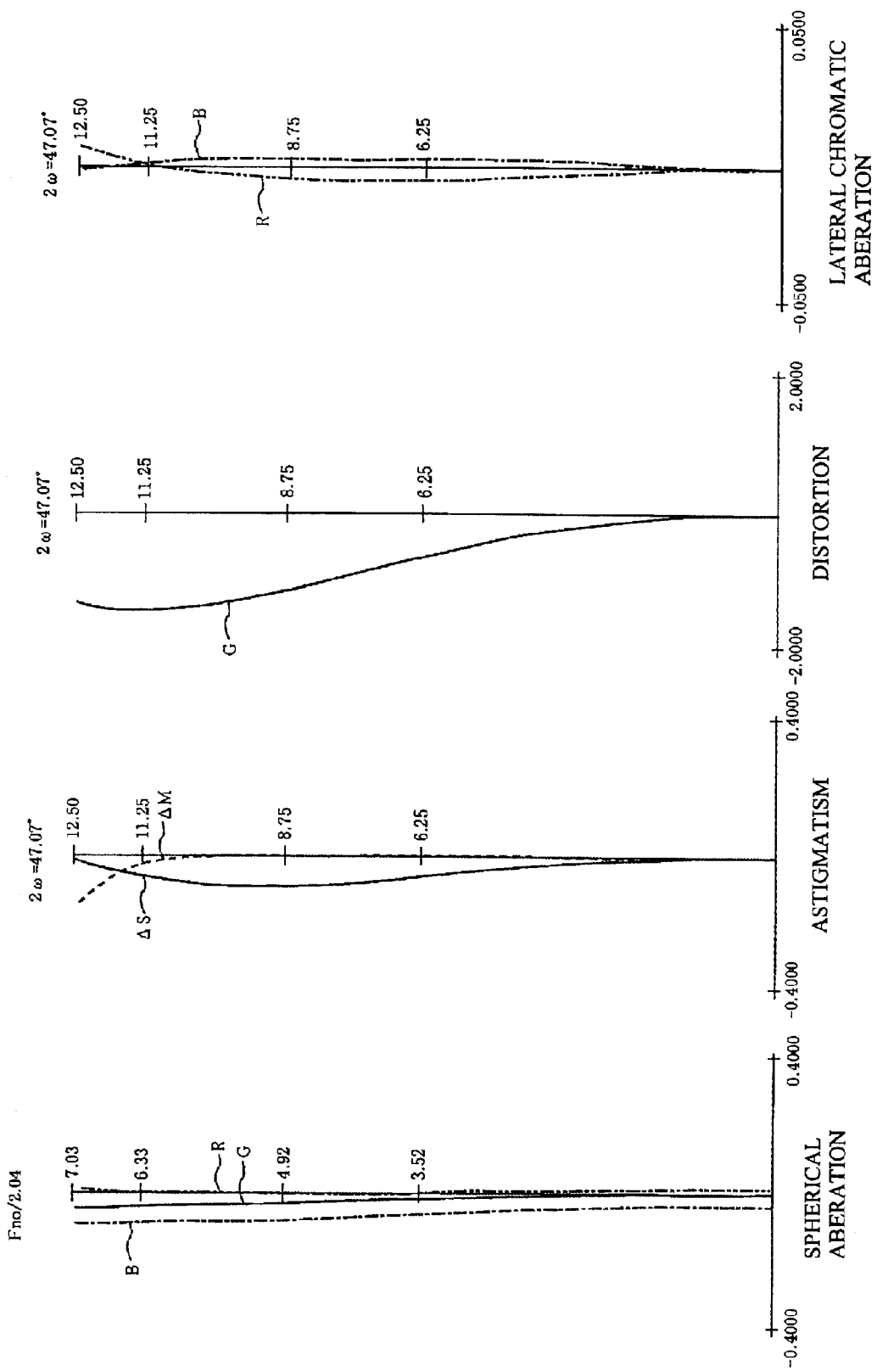
FIG. 11 shows graphic representations of aberrations at the wide-angle end of the numerical example 3 according to the present invention.
Figure 12:
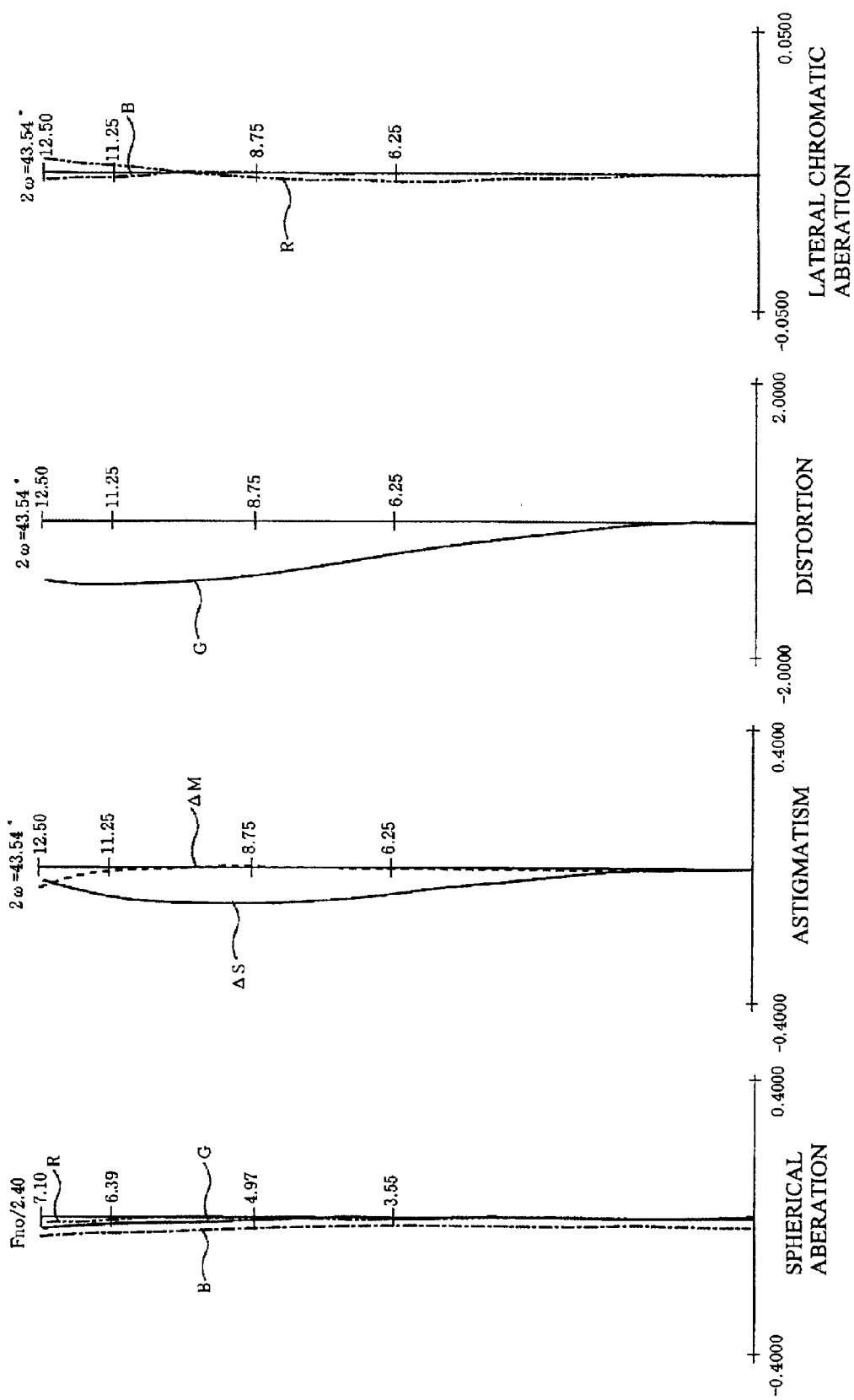
FIG. 12 shows graphic representations of aberrations at the intermediate position of the numerical example 3 according to the present invention.
Figure 13:
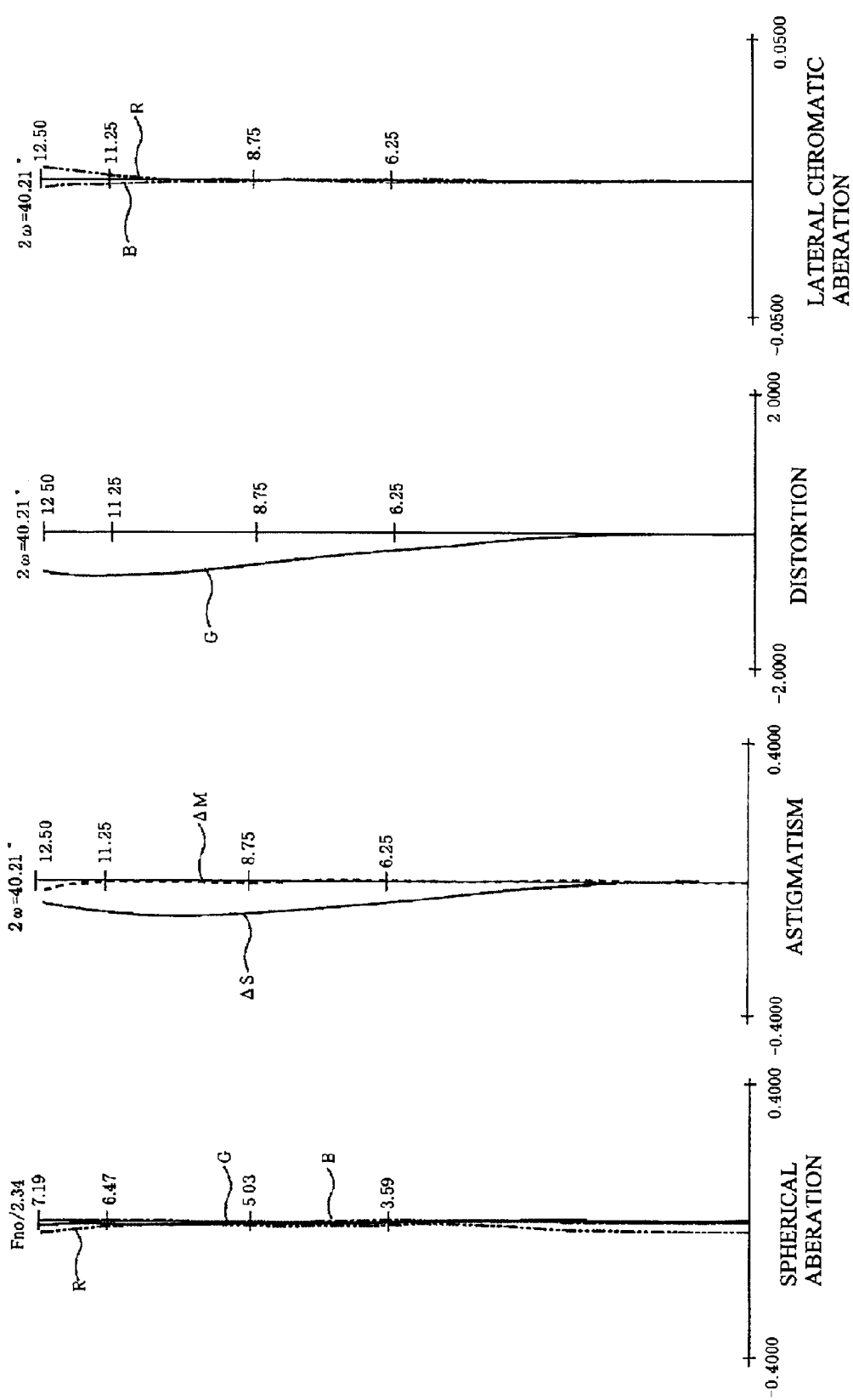
FIG. 13 shows graphic representations of aberrations at the telephoto end of the numerical example 3 according to the present invention.
Figure 14:
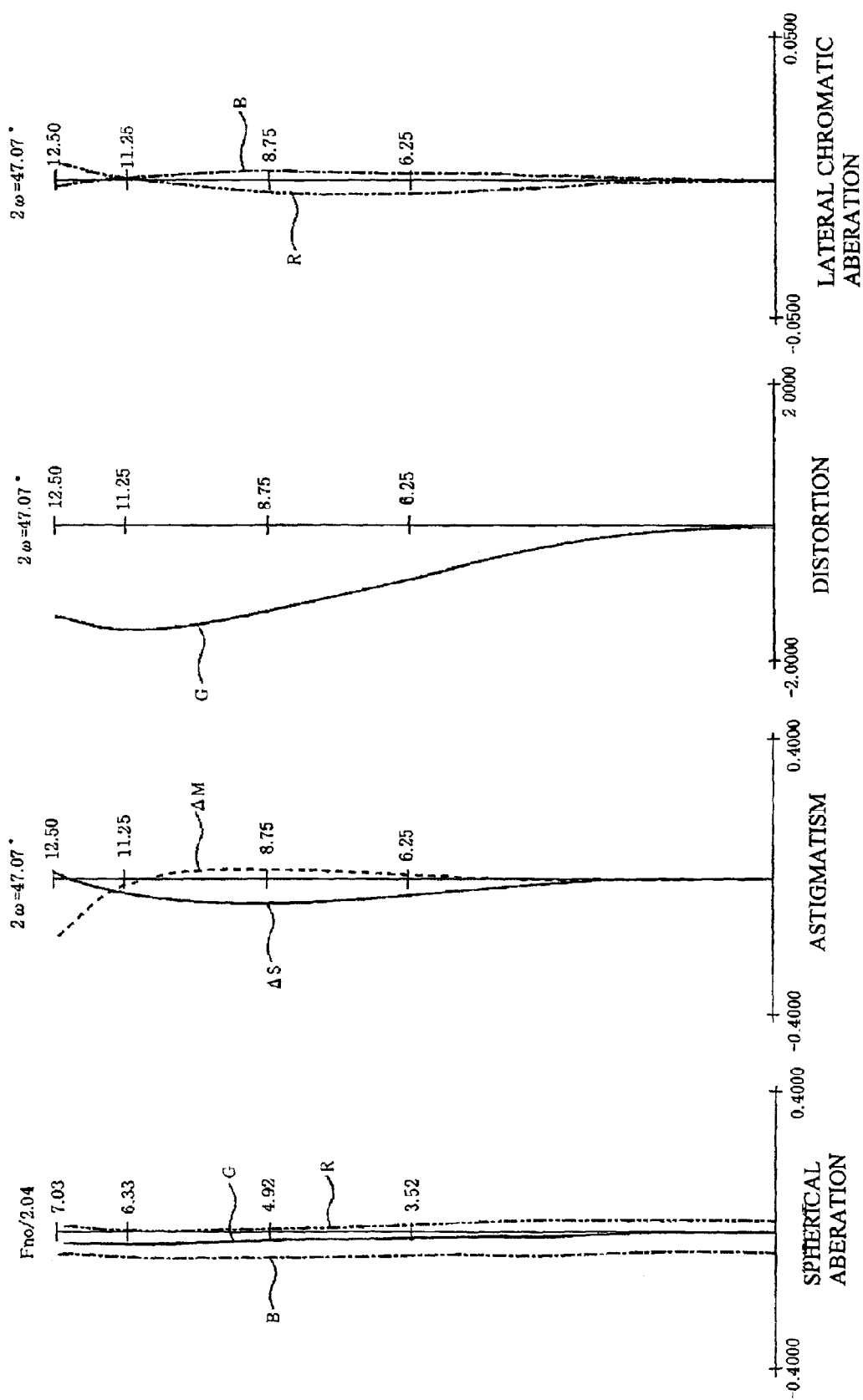
FIG. 14 shows graphic representations of aberrations at the wide-angle end of the numerical example 4 according to the present invention.
Figure 15:
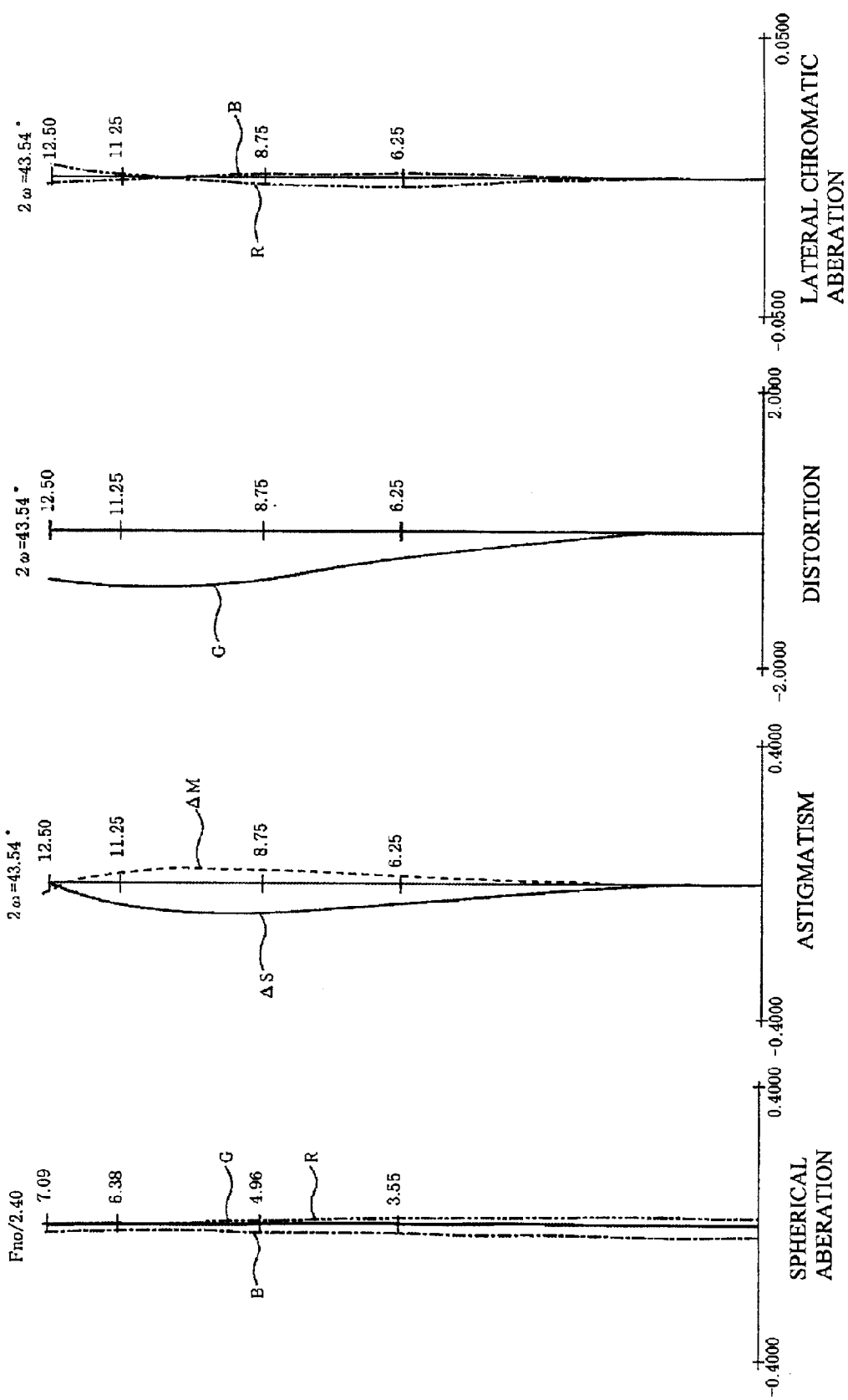
FIG. 15 shows graphic representations of aberrations at the intermediate position of the numerical example 4 according to the present invention.
Figure 16:
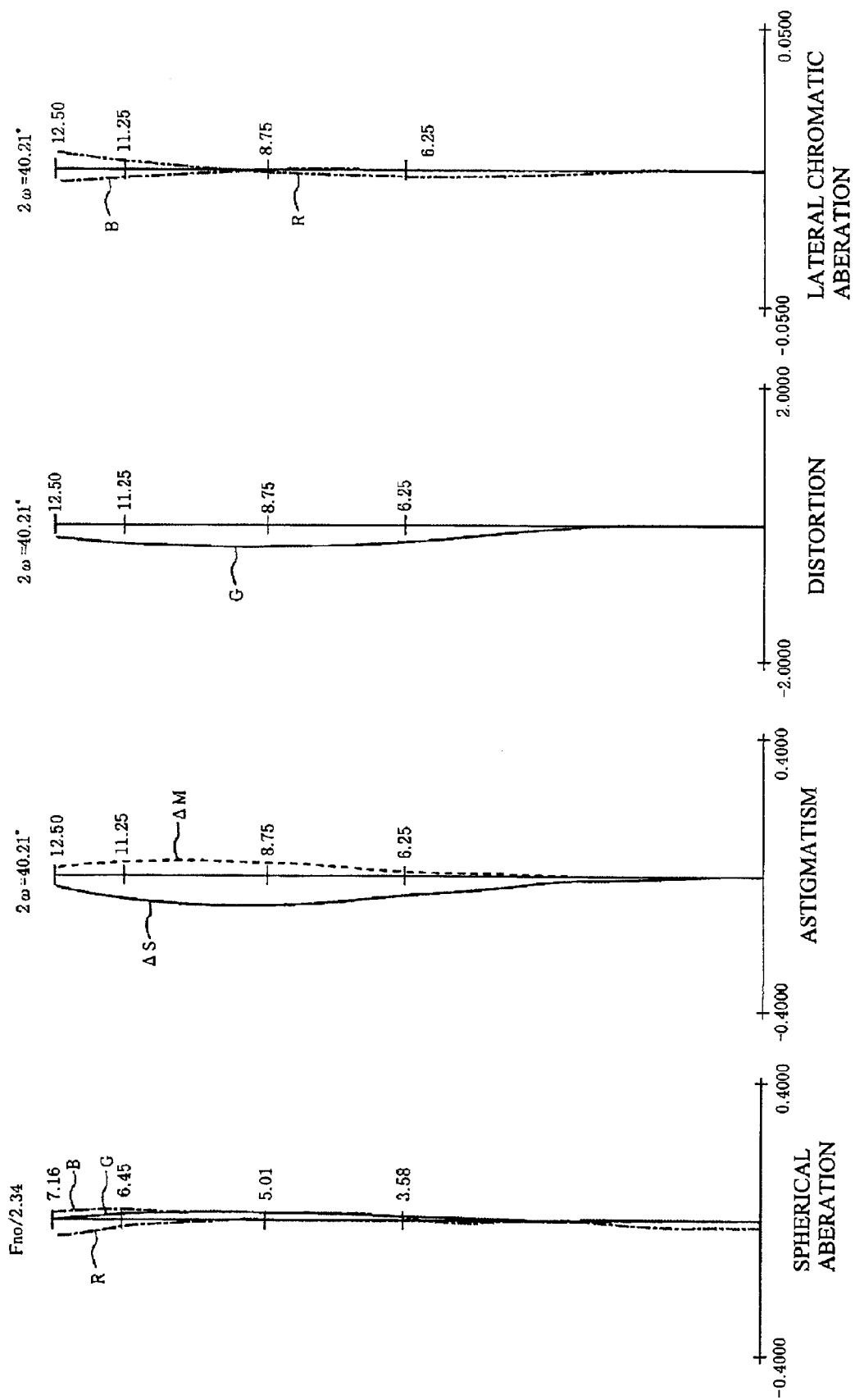
FIG. 16 shows graphic representations of aberrations at the telephoto end of the numerical example 4 according to the present invention.

On condition of the above structure, a description will now be given of four, i.e., first to fourth numerical examples, with reference to drawings. In each numerical example, "ri" represents a radius of curvature of the i-th lens surface in order from the more distant conjugate point. "di" represents a thickness of the i-th lens or a separation of air in order from the more distant conjugate point. "ni" and "vi" are the refractive index and Abbe number of the glass material of the i-th lens in order from the more distant conjugate point. FIGS. 1–4 are lens sectional views of numerical examples of 1–4 according to the present invention. In each figure, the more distant conjugate point is at a side of screen and the less distant conjugate point is at a side of liquid crystal panel. L1–L5 in FIGS. 1 and 2 represent first to fifth lens units and L1–L6 in FIGS. 3 and 4 represent first to sixth lens units. SP is a stop, located between the third lens unit L3 and the fourth lens unit L4 in each example. GB is a color composite prism, a polarizing filter, and a glass block such as a color filter. Arrows indicate moving loci of each lens unit during zooming from the wide-angle end to the telephoto end. FIGS. 5–7, 8–10, 11–13, and 14–16 correspond respectively to the wide-angle end, the intermediate end, and the telephoto end for examples 1–4, where B, G, and R in each figure respectively indicate light having wavelengths of 470 nm, 550 nm, and 650 nm, while ΔM and ΔS are respectively meridional and sagittal image surfaces.

NUMERICAL EXAMPLE 1

FIG. 1 shows a lens sectional view of the numerical example 1. There is provided an exemplary five-unit structure including, in order from the more distant conjugate point, a first lens unit L1 of negative refractive power, a second lens unit L2 of negative refractive power, a third lens unit L3 of positive refractive power, a fourth lens unit L4 of negative refractive power, and a fifth lens unit L5 of positive refractive power, wherein a diffraction optical element is introduced into the fifth lens unit L5.

Here, each lens unit is configured as follows: The first lens unit L1 has three lenses including, in order from the more distant conjugate point, a positive lens, a negative lens and a negative lens. The second lens unit L2 has two lenses including, in order from the more distant conjugate point, a positive lens and a negative lens. The third lens unit L3 includes one positive lens. The fourth lens unit L4 includes one negative lens. The fifth lens unit L5 has two lenses including, in order from the more distant conjugate point, a cemented lens of negative and positive lenses, and a positive lens. During zooming from the wide-angle end to the telephoto end, the second and third lens units L2 and L3 both move towards the more distant conjugate point, whereas the fourth lens unit L4 moves towards the less distant conjugate point. The first and fifth lens unit L1 and L5 do not move in this condition. The first lens unit L1 is moved for focusing purposes.

NUMERICAL EXAMPLE 2

FIG. 2 shows a lens sectional view of the numerical example 2. Similar to the numerical example 1 shown in FIG. 17 there is provided a five-unit structure including, in order from the more distant conjugate point, a first lens unit L1 of negative refractive power, a second lens unit L2 of negative refractive power, a third lens unit L3 of positive refractive power, a fourth lens unit L4 of negative refractive power, and a fifth lens unit L5 of positive refractive power, wherein a diffraction optical element is introduced into the fifth lens unit L5.

Here, each lens unit is configured as follows: The first lens unit L1 has three lenses including, in order from the more distant conjugate point, a positive lens, a negative lens and a negative lens. The second lens unit L2 includes one negative lens. The third lens unit L3 includes one positive lens. The fourth lens unit L4 includes one negative lens. The fifth lens unit L5 has two lenses including, in order from the more distant conjugate point, a cemented lens of negative and positive lenses, and a positive lens. In comparison with the numerical example 1, a moving amount of each of the second and third lens units L2 and L3 towards the more distant conjugate point increases since the positive lens closest to the more distant conjugate point is removed from the second lens unit L2. In addition, the fourth lens unit L4 simply moves in the less distant conjugate point similar to the numerical example 1. As a consequence, along with zooming, a separation between the third and fourth lens units L3 and L4 is extended when these units move. The first and fifth lens units L1 and L5 do not move during zooming, and the first lens unit L1 is moved for focusing purposes.

NUMERICAL EXAMPLE 3

FIG. 3 shows a lens sectional view of the numerical example 3. There is provided a six-unit structure including, in order from the more distant conjugate point, a first lens unit L1 of negative refractive power, a second lens unit L2 of negative refractive power, a third lens unit L3 of positive refractive power, a fourth lens unit L4 of negative refractive power, a fifth lens unit L5 of positive refractive power, and a sixth lens unit L6 of positive refractive power, wherein a diffraction optical element is introduced into the fifth lens unit L5.

Here, each lens unit is configured as follows: The first lens unit L1 has three lenses including, in order from the more distant conjugate point, a positive lens, a negative lens and a negative lens. The second lens unit L2 has two lenses including, in order from the more distant conjugate point, a positive lens and a negative lens. The third lens unit L3 includes one positive lens. The fourth lens unit L4 includes one negative lens. The fifth lens unit L5 has two lenses including, in order from the more distant conjugate point, a cemented lens of negative and positive lenses, and a positive lens. The sixth lens unit L6 is one positive lens. During zooming from the wide-angle end to the telephoto end, the second, third and fifth lens units L2, L3 and L5 move towards the more distant conjugate point, whereas the fourth lens unit L4 moves towards the less distant conjugate point. The first and sixth lens unit L1 and L6 do not move in this condition. The first lens unit L1 is moved for focusing purposes.

NUMERICAL EXAMPLE 4

FIG. 4 shows a lens sectional view of the numerical example 4. Similar to the numerical example 3, there is provided a six-unit structure including, in order from the more distant conjugate point, a first lens unit L1 of negative refractive power, a second lens unit L2 of negative refractive power, a third lens unit L3 of positive refractive power, a fourth lens unit L4 of negative refractive power, a fifth lens unit L5 of positive refractive power, and a sixth lens unit L6 of positive refractive power, wherein a diffraction optical element is introduced into the fifth lens unit L5.

Here, each lens unit is configured as follows: The first lens unit L1 has three lenses including, in order from the more distant conjugate point, a positive lens, a positive lens and a negative lens. The second lens unit L2 includes one negative lens. The third lens unit L3 includes one positive lens. The fourth lens unit L4 includes one negative lens. The fifth lens unit L5 has two lenses including, in order from the more distant conjugate point, a cemented lens of negative and positive lenses, and a positive lens. The sixth lens unit L6 is one positive lens. In comparison with the numerical example 3, a moving amount of each of the second and third lens units L2 and L3 towards the more distant conjugate point increases since the positive lens closest to the more distant conjugate point is removed from the second lens unit L2. In addition, the fourth lens unit L4 simply moves in the less distant conjugate point similar to the numerical example 1. As a consequence, during zooming from the wide-angle end to the telephoto end, the third and fourth lens units L3 and L4 move and extend a separation between them. The first and sixth lens units L1 and L6 do not move during zooming, and the first lens unit L1 is moved for focusing purposes.

Next follows a result of calculating the conditional expressions (1) to (9) for the above numerical examples 1–4:

TABLE 1

| | NE | | | |
|---|---|---|---|---|
| CE | Numerical Example 1 | Numerical Example 2 | Numerical Example 3 | Numerical Example 4 |
| (1) | −0.195 | −0.0448 | −0.306 | −0.0882 |
| (2) | −0.322 | −0.523 | −0.159 | −0.519 |
| (3) | 0.914 | 0.892 | 0.917 | 0.991 |
| (4) | 0.334 | 0.133 | 0.500 | 0.383 |
| (5) | 1.33 | 1.51 | 1.77 | 1.13 |
| (6) | 0.154 | 0.343 | 0.782 | 0.183 |
| (7) | 0.0195 | 0.297 | 0.797 | 0.368 |
| (8) | $1.51 \times 10^{-3}$ | $2.46 \times 10^{-3}$ | $1.00 \times 10^{-3}$ | $1.37 \times 10^{-3}$ |
| (9) | $8.57 \times 10^{-7}$ | $6.98 \times 10^{-7}$ | $2.74 \times 10^{-6}$ | $7.85 \times 10^{-7}$ |

NE: Numerical Examples
CE: Conditional Expressions

A description will now be given of diffraction optical element's position and structure for each numerical example.

In considering a target unit to which the diffraction optical element is introduced, it is assumed that each example uses a thin simple lens for an axial arrangement in order to simplify the issue. Here, a chromatic aberration is considered where h is a height from an optical axis for paraxial axial ray transmitting each lens unit, whereas $\bar{h}$ is a height from the optical axis for the pupil paraxial ray.

The following relational expressions are established where L is an axial chromatic-aberration coefficient of an entire optical system before the diffraction optical element is introduced, T is a lateral chromatic-aberration coefficient, $L_D$ and $T_D$ are respectively axial and lateral chromatic-aberration coefficients of a unit to which the diffraction optical element is introduced, and $L_{TOT}$ and $T_{TOT}$ are respectively axial and lateral chromatic-aberration coefficients of the entire system after the diffraction optical element is introduced.

$$L_{TOT} = L + L_D$$

$$T_{TOT} = T + T_D \tag{a}$$

$$L_D = h_D^2 \frac{\phi_D}{v_D} \tag{b}$$

$$T_D = h_D \bar{h}_D \frac{\phi_D}{v_D}$$

where $h_D$, $\bar{h}_D$ are heights from the optical axes of paraxial axial and pupil paraxial rays transmitting a lens unit to which the diffraction optical element is introduced, $\Phi_D$ and $v_D$ are respectively a refractive power and Abbe number of the diffraction optical element, and $v_D = -3.45$.

In addition, the following relational expression is established between a chromatic-aberration coefficient, e.g., the axial and lateral chromatic-aberration coefficients, and chromatic aberrations, e.g., axial and lateral chromatic aberrations:

$$(\text{Axial-Chromatic-Aberration}) \propto -L$$

$$(\text{Lateral-Chromatic-Aberration}) \propto -T \tan \omega \tag{c}$$

where ω represents a half angle of field of each ray.

In general, the projection optical system used for the liquid crystal projector and the like is likely to generate axial and lateral chromatic aberrations in the positive side, and thus it is understood that each of the axial chromatic-aberration coefficient L and lateral chromatic-aberration coefficient T for the entire system before the diffraction optical element is introduced has a negative value from the equation (C). Corrections to these axial and lateral chromatic aberrations require values of the chromatic-aberration coefficients $L_{TOT}$ and $T_{TOT}$ for the entire system approach zero after the diffraction optical element is introduced. In view of the equation (a) and the fact that the axial and lateral chromatic-aberration coefficients L and T have negative values before the diffraction optical element is introduced, the diffraction optical element is introduced to such a unit that the axial and lateral chromatic-aberration coefficients $L_D$ and $T_D$ in the unit to which the diffraction optical element is introduced may be positive.

When this is applied to the present invention, it is preferable to introduce the diffraction optical element to any one of lens units (i.e., the fourth, fifth and sixth lens units) closer to the less distant conjugate point than the stop between the third and fourth lens units, so as to correct the axial and lateral chromatic aberrations at the same time. The diffraction efficiency is apprehensive of decreasing at a surface to which the diffraction optical element is provided, when an angular difference is generated at a lens surface in a tangential direction at ray incident positions for the axial and non-axial rays. Accordingly, the diffraction optical element is preferably located at a lens surface so that the axial and non-axial rays may be concentric. In addition, the outermost lens surface is apprehensive of resulting in diffraction optical element's deterioration due to the dust and heat from the light source. Therefore, it is recommended to avoid arrange the diffraction optical element onto the outermost lens surface except for inevitable reasons, for example, for correcting the aberration. From the foregoing in mind, the diffraction optical element is preferably located at the fifth lens unit.

While the diffraction optical element is provided on an optical surface, the base may be a spherical surface, plane surface, aspherical surface, or surface of second degree. The diffraction optical element may be formed using a method of applying a film, as the diffraction optical surface, of plastic or the like onto the optical surface (so as to form so-called "replica aspherical surface").

A method for manufacturing a diffraction optical element of this embodiment may use, in addition to directly forming a binary optics like shape onto a lens surface, a mold obtained by the direct forming method to execute replica forming and molding. A sawlike Kinoform may improve efficiency, and provides the diffraction efficiency close to the ideal value.

A shape of the diffraction optical element of this embodiment may be expressed by the following equation using λ as the reference wavelength (d line), H as a distance from the optical axis, and Φ(H) as a phase:

$$\Phi(H) = 2\pi/\lambda (C_1 * H^2 + C_2 * H^4 + \ldots + C_2 * H^{2i}) \tag{d}$$

where Φ(H) is a phase shape of a diffraction surface, H is a height from the optical axis perpendicular to the optical axis, λ is a designed (herein $1^{st}$) wavelength, and $C_n$ denotes an n-th phase coefficient. As is clear from the equation (d), the distance H from the optical axis adjusts the phase. The larger the lens diameter is, the more influential a coefficient of the high order becomes.

In order to maximize the diffraction optical element for correction to the aberration and the small lens span for each example, the respectively coefficients are preferably set so as to satisfy the following conditional expressions:

$$1.0 \times 10^{-5} < |C_2/C_1| < 1.0 \times 10^{-1} \quad (8)$$

$$1.0 \times 10^{-9} < |C_3/C_1| < 1.0 \times 10^{-4} \quad (9)$$

where coefficients $C_1$, $C_2$ and $C_3$ are the same as those in the equation (d). The ratio exceeding the upper or lower limit in the above two conditional expressions makes difficult the correction to the aberration and the manufacture of the diffraction optical element.

Figure 17:
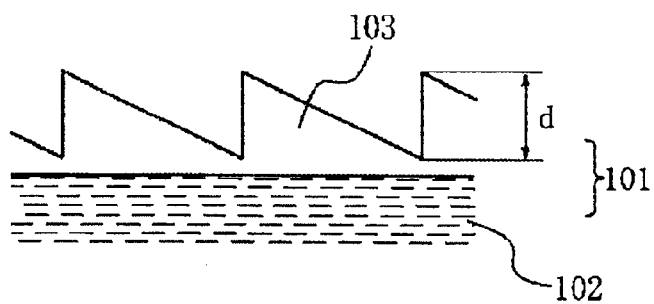
FIG. 17 shows a sectional view of a diffraction optical element according to the present invention.
Figure 18:
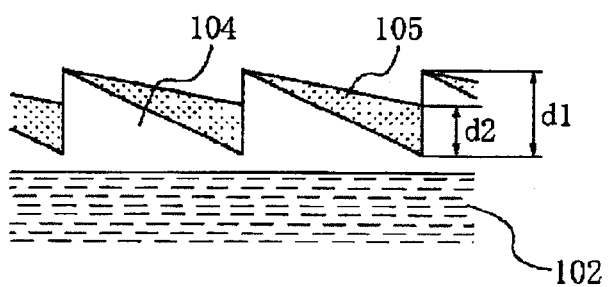
FIG. 18 shows a sectional view of a diffraction optical element according to the present invention.

An exemplary structure of the diffraction optical element applicable to the present embodiment includes one layer of Kinoform shown in FIG. 17 and a diffraction optical element of two stacked layers shown in FIG. 18. Here, FIGS. 17 and 18 are sectional views of the diffraction optical element according to the present invention.

Figure 19:
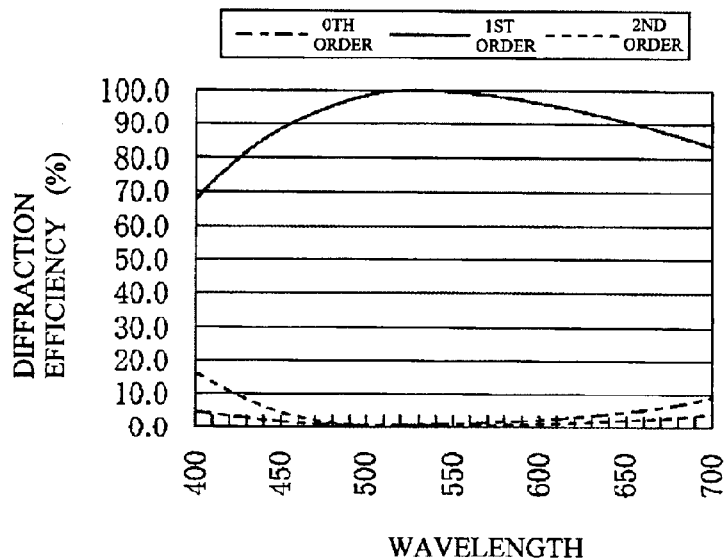
FIG. 19 is a wavelength dependency of the diffraction optical element shown in FIG. 17.

FIG. 19 is a wavelength dependency of the diffraction efficiency of first order diffracted light in the diffraction optical element 101 shown in FIG. 17. This figure assigns a wavelength of light incident upon the diffraction optical element to a lateral axis, and the diffraction efficiency of the diffraction optical element to a vertical axis. The actual structure of the diffraction optical element 101 is made, as shown in FIG. 17, by applying ultraviolet hardening resin onto the surface of a base 102, and forming the diffraction grating 103 having the grating thickness D so that the diffraction efficiency becomes 100% for the first order diffracted light with the wavelength of 530 nm at the resin part.

As evident from FIG. 19, the diffraction efficiency of the designed order decreases as a distance from the optimal wavelength of 530 nm becomes longer, while the diffraction efficiency of $0^{th}$ and $2^{nd}$ diffracted light near the desired order increase. The enhanced diffracted light other than the designed order would possibly result in flare and lead to the decreased resolution in the optical system.

Figure 20:
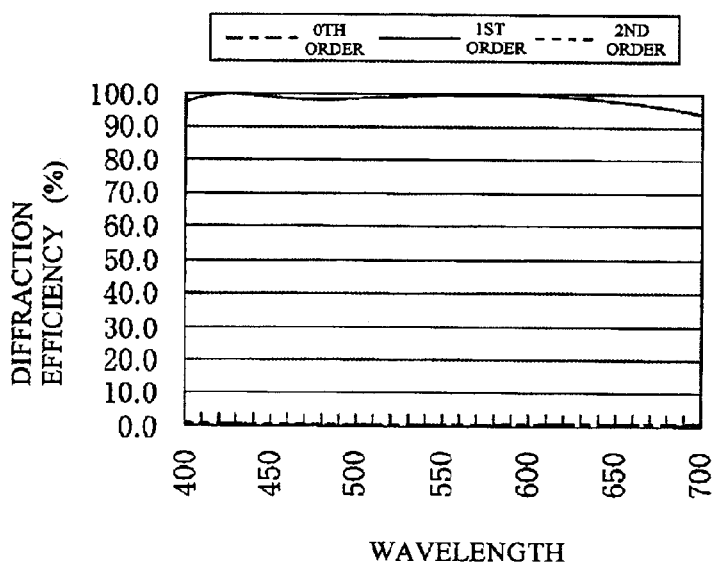
FIG. 20 is a wavelength dependency of the diffraction optical element shown in FIG. 18.

FIG. 20 is a graph showing the wavelength dependency of the layered diffraction optical element, or the stacked layers of two diffraction optical elements 104 and 105 shown in FIG. 18. This figure assigns a wavelength of light incident upon the diffraction optical element to a lateral axis, and the diffraction efficiency of the diffraction optical element to a vertical axis. In FIG. 18, a first diffraction optical element 104 made of the ultraviolet hardening resin (nd=1.499, vd=54) is formed on the base 102, and a second diffraction optical element 105 made of another ultraviolet hardening resin (nd=1.598, vd=28) is formed on the first diffraction optical element 104. A combination of these materials sets up the grating thickness d1 of the first diffraction optical element 104 to be 13.8 μm, and the grating thickness d2 of the second diffraction optical element 105 to be 10.5 μm. As is apparent from FIG. 20, the diffraction optical element having a layered structure provides such a high diffraction efficiency of the designed order of 95% or higher throughout the entire usable wavelength.

Thus, as in this embodiment, the diffraction optical element using the layered structure may further improve the optical performance.

Figure 21:
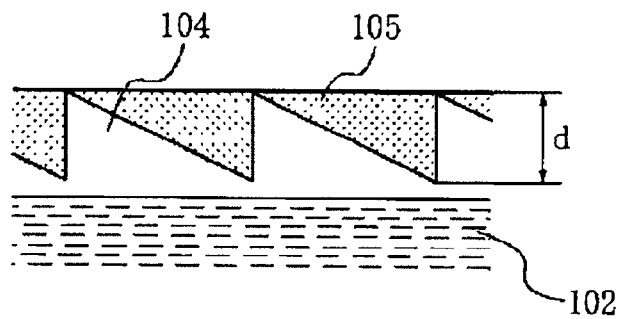
FIG. 21 shows a sectional view of a diffraction optical element according to the present invention.

The material for the diffraction optical element is not limited to ultraviolet hardening resin, but may utilize plastic and other materials. In an alternate embodiment, the first diffraction grating part 104 is directly formed on the base when a material of base allows. Each grating thickness is necessarily required, and two diffraction gratings may have the same thickness as shown in FIG. 21 when the materials for the gratings allows. Here, FIG. 21 is a sectional view of the diffraction optical element according to the present invention. In this case, a diffraction optical element's surface does not include a grating shape, facilitating assembly work of the diffraction optical element, and providing a dustproof and inexpensive optical system.

Figure 22:
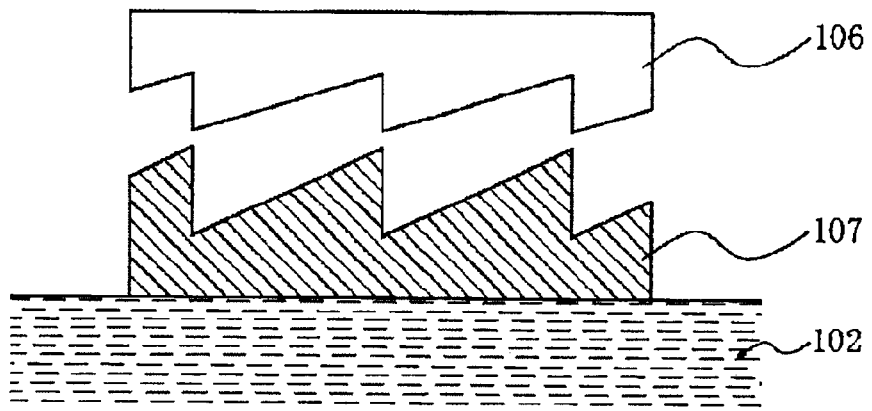
FIG. 22 shows a sectional view of a diffraction optical element according to the present invention.

As shown in FIG. 22, the diffraction efficiency similar to that of diffraction grating shown in FIG. 18 may be also available using a diffraction optical element having a layered structure including a first diffraction grating 107 made of ultraviolet hardening resin (nd=1.6685, vd=19.7) is formed on the base 102, and a second diffraction grating 106 made of another ultraviolet resin (nd=1.5240, vd=50.8) is formed apart from the diffraction grating 107 so as to set an interval between their sawlike threads to be about 1.5 μm. A combination of the materials sets the grating thickness d1 of the first grating 107 to be 5.0 μm, and the grating thickness d2 of the second grating 106 to be 7.5 μm. Here, FIG. 22 is a sectional view of the diffraction optical element according to the present invention.

The diffraction optical element having the above structures of this embodiment may reduce the chromatic aberration and the number of lenses, as well as provide a zoom lens system having the good optical performance. Of course, the diffraction optical element applicable to the instant embodiment may use another structure of diffraction optical element.

Figure 23:
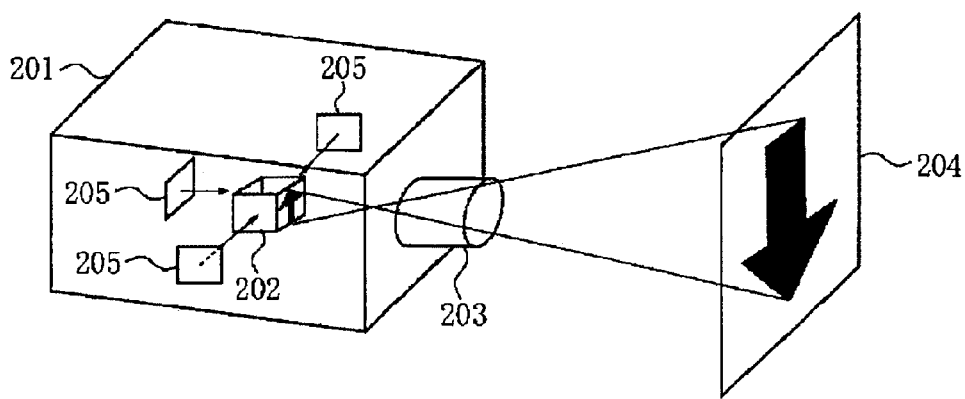
FIG. 23 is a schematic block diagram of a liquid crystal projector using the zoom lens system according to the present invention.
Figure 24:
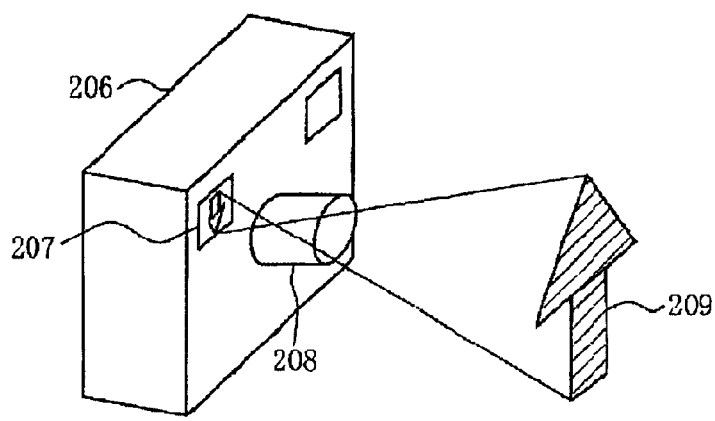
FIG. 24 is schematic block diagram of a camera using the zoom lens system according to the present invention.

The above zoom lens is applicable to a liquid crystal projector, a camera, etc. FIG. 23 is a block diagram of the liquid crystal projector using the zoom lens according to the present invention. FIG. 24 is a block diagram of the camera using the zoom lens according to the present invention. In a liquid crystal projector body 201, a prism 202 synthesizes three RGB color images formed by a liquid crystal panel 205 located at a less distant conjugate position, and a projection lens 203 or the zoom lens system according to the present invention projects synthesized beam emitted and projected from the prism onto a screen 204. In FIG. 24, in a camera body 206, an image of subject 209 is formed on a photosensitive body 207 at a less distant conjugate position through an image pick-up lens 208 or the zoom lens system according to the present invention. The application for the zoom lens system is not limited to the above. For example, the zoom lens system may be applicable to a rear projection type liquid crystal projector and other optical apparatuses as well as a front projection type liquid crystal projector shown in FIG. 23.

[Numerical Example 1]

Diffraction Surface
20th Surface $C1 = -3.53180 \times 10^{-4}$
$C2 = 5.31570 \times 10^{-7}$
$C3 = 3.08930 \times 10^{-10}$
f = 28.70168–34.15107       fno = 1:2.04–2.34       $2\omega$ = 47.07°–40.21°

| | | | |
|---|---|---|---|
| r 1 = 63.850 | d 1 = 3.11 | n 1 = 1.88572 | ν 1 = 37.5 |
| r 2 = −220.262 | d 2 = 0.15 | | |
| r 3 = 35.733 | d 3 = 1.50 | n 2 = 1.48849 | ν 2 = 70.4 |
| r 4 = 15.053 | d 4 = 2.92 | | |
| r 5 = 69.302 | d 5 = 1.50 | n 3 = 1.49648 | ν 3 = 69.5 |
| r 6 = 33.020 | d 6 = Variable | | |
| r 7 = −7158.520 | d 7 = 1.86 | n 4 = 1.85780 | ν 4 = 23.0 |
| r 8 = −49.732 | d 8 = 0.56 | | |
| r 9 = −27.197 | d 9 = 1.50 | n 5 = 1.85780 | ν 5 = 23.0 |
| r10 = −296.581 | d10 = Variable | | |

-continued

| | | | |
|---|---|---|---|
| r11 = | 22.329 d11 = 2.65 | n 6 = 1.71151 | ν 6 = 43.0 |
| r12 = | 23227.510 d12 = 0.3 | | |
| r13 = | 0.000 d13 = Variable | | |
| | (Stop) | | |
| r14 = | −28.984 d14 = 1.50 | n 7 = 1.51684 | ν 7 = 67.5 |
| r15 = | 34.243 d15 = Variable | | |
| r16 = | −92.572 d16 = 1.50 | n 8 = 1.85780 | ν 8 = 23.0 |
| r17 = | 39.308 d17 = 4.95 | n 9 = 1.69667 | ν 9 = 54.5 |
| r18 = | −43.432 d18 = 0.15 | | |
| r19 = | 448.130 d19 = 3.81 | n10 = 1.85641 | ν10 = 43.2 |
| r20 = | −44.609 d20 = 0.5 | | |
| r21 = | 90.756 d21 = 3.59 | n11 = 1.85663 | ν11 = 43.2 |
| r22 = | −107.613 d22 = 5.14 | | |
| r23 = | 0.000 d23 = 41.50 | n12 = 1.62528 | ν12 = 58.2 |
| r24 = | 0.000 | | |

| Variable Separation | Focal Length | | |
|---|---|---|---|
| | 28.70 | 31.30 | 34.15 |
| d 6 | 3.48 | 2.83 | 2.62 |
| d10 | 0.50 | 1.33 | 1.47 |
| d13 | 2.74 | 5.52 | 8.20 |
| d15 | 9.13 | 6.17 | 3.56 |

[Numerical Example 2]

Diffraction Surface
18th Surface $C1 = -3.65990 \times 10^{-4}$
$C2 = 8.98550 \times 10^{-7}$
$C3 = -2.55590 \times 10^{-10}$
f = 28.70041–34.15057   fno = 1:2.04–2.34   $2_\omega$ = 47.07°–40.21°

| | | | |
|---|---|---|---|
| r 1 = | 45.885 d 1 = 3.81 | n 1 = 1.88481 | ν 1 = 36.8 |
| r 2 = | −1448.483 d 2 = 0.15 | | |
| r 3 = | 30.137 d 3 = 1.50 | n 2 = 1.48849 | ν 2 = 70.4 |
| r 4 = | 14.417 d 4 = 2.61 | | |
| r 5 = | 40.354 d 5 = 1.50 | n 3 = 1.48849 | ν 3 = 70.4 |
| r 6 = | 26.150 d 6 = Variable | | |
| r 7 = | −27.200 d 7 = 1.50 | n 4 = 1.69010 | ν 4 = 29.4 |
| r 8 = | −98.627 d 8 = Variable | | |
| r 9 = | 26.562 d 9 = 2.31 | n 5 = 1.82926 | ν 5 = 45.4 |
| r10 = | 5462.617 d10 = 0.3 | | |
| r11 = | 0.000 d11 = Variable | | |
| | (Stop) | | |
| r12 = | −27.495 d12 = 1.50 | n 6 = 1.52077 | ν 6 = 67.2 |
| r13 = | 57.586 d13 = Variable | | |
| r14 = | −132.244 d14 = 1.50 | n 7 = 1.85780 | ν 7 = 23.0 |
| r15 = | 31.436 d15 = 4.22 | n 8 = 1.58998 | ν 8 = 62.1 |
| r16 = | −88.921 d16 = 0.15 | | |
| r17 = | −366.881 d17 = 3.36 | n 9 = 1.87714 | ν 9 = 41.8 |
| r18 = | −39.369 d18 = 0.5 | | |
| r19 = | 64.293 d19 = 4.77 | n10 = 1.88959 | ν10 = 41.0 |
| r20 = | −64.359 d20 = 5.14 | | |
| r21 = | 0.000 d21 = 41.50 | n11 = 1.62528 | ν11 = 58.2 |
| r22 = | 0.000 | | |

| Variable Separation | Focal Length | | |
|---|---|---|---|
| | 28.70 | 31.30 | 34.15 |
| d 6 | 5.55 | 4.49 | 3.67 |
| d 8 | 0.50 | 0.80 | 0.75 |
| d11 | 1.09 | 4.72 | 8.20 |
| d13 | 10.01 | 7.15 | 4.53 |

[Numerical Example 3]

Diffraction Surface
20th Surface $C1 = -3.76150 \times 10^{-4}$
$C2 = 3.76250 \times 10^{-7}$
$C3 = 1.03130 \times 10^{-9}$
f = 28.69958–34.14701   fno = 1:2.04–2.34   $2_\omega$ = 47.07°–40.21°

| | | | |
|---|---|---|---|
| r 1 = | 65.866 d 1 = 3.15 | n 1 = 1.83876 | ν 1 = 37.2 |
| r 2 = | −176.072 d 2 = 0.15 | | |
| r 3 = | 41.739 d 3 = 1.50 | n 2 = 1.48898 | ν 2 = 70.2 |

-continued

| | | | |
|---|---|---|---|
| r 4 = | 16.154 d 4 = 2.80 | | |
| r 5 = | 236.204 d 5 = 1.50 | n 3 = 1.48898 | ν 3 = 70.2 |
| r 6 = | 36.066 d 6 = Variable | | |
| r 7 = | 308.317 d 7 = 1.93 | n 4 = 1.85415 | ν 4 = 23.8 |
| r 8 = | −51.886 d 8 = 0.57 | | |
| r 9 = | −27.425 d 9 = 1.50 | n 5 = 1.85415 | ν 5 = 23.8 |
| r10 = | −141.858 d10 = Variable | | |
| r11 = | 22.020 d11 = 2.63 | n 6 = 1.72019 | ν 6 = 47.9 |
| r12 = | 899.965 d12 = 0.33 | | |
| r13 = | 0.000 d13 = Variable | | |
| | (Stop) | | |
| r14 = | −30.826 d14 = 1.50 | n 7 = 1.62261 | ν 7 = 60.3 |
| r15 = | 41.800 d15 = Variable | | |
| r16 = | −58.854 d16 = 1.50 | n 8 = 1.85415 | ν 8 = 23.8 |
| r17 = | 36.437 d17 = 4.88 | n 9 = 1.68052 | ν 9 = 55.3 |
| r18 = | −39.630 d18 = 0.15 | | |
| r19 = | −2566.075 d19 = 3.44 | n10 = 1.88761 | ν10 = 40.8 |
| r20 = | −42.942 d20 = Variable | | |
| r21 = | 72.554 d21 = 3.85 | n11 = 1.88761 | ν11 = 40.8 |
| r22 = | −94.165 d22 = 5.14 | | |
| r23 = | 0.000 d23 = 41.50 | n12 = 1.62528 | ν12 = 58.2 |
| r24 = | 0.000 | | |

| Variable Separation | Focal Length | | |
|---|---|---|---|
| | 28.70 | 31.30 | 34.15 |
| d 6 | 3.99 | 3.21 | 2.25 |
| d10 | 0.53 | 0.5 | 0.5 |
| d13 | 4.00 | 6.10 | 7.99 |
| d15 | 7.50 | 5.44 | 3.35 |
| d20 | 0.50 | 1.27 | 2.43 |

[Numerical Example 4]

Diffraction Surface
18th Surface $C1 = -3.61700 \times 10^{-4}$
$C2 = 4.94330 \times 10^{-7}$
$C3 = 2.83840 \times 10^{-10}$
f = 28.69958–34.14988   fno = 1:2.04–2.34   $2_\omega$ = 47.07°–40.21°

| | | | |
|---|---|---|---|
| r 1 = | 191.878 d 1 = 2.66 | n 1 = 1.80768 | ν 1 = 46.6 |
| r 2 = | −115.943 d 2 = 0.15 | | |
| r 3 = | 84.429 d 3 = 2.09 | n 2 = 1.76099 | ν 2 = 27.5 |
| r 4 = | 356.453 d 4 = 0.15 | | |
| r 5 = | 44.503 d 5 = 1.50 | n 3 = 1.48898 | ν 3 = 70.2 |
| r 6 = | 14.456 d 6 = Variable | | |
| r 7 = | −21.815 d 7 = 1.50 | n 4 = 1.58447 | ν 4 = 40.8 |
| r 8 = | −68.834 d 8 = Variable | | |
| r 9 = | 24.741 d 9 = 2.65 | n 5 = 1.77582 | ν 5 = 49.6 |
| r10 = | −233.839 d10 = 0.3 | | |
| r11 = | 0.000 d11 = Variable | | |
| | (Stop) | | |
| r12 = | −31.363 d12 = 1.50 | n 6 = 1.48898 | ν 6 = 70.2 |
| r13 = | 33.754 d13 = Variable | | |
| r14 = | −81.904 d14 = 1.50 | n 7 = 1.85415 | ν 7 = 23.8 |
| r15 = | 34.179 d15 = 4.79 | n 8 = 1.62261 | ν 8 = 60.3 |
| r16 = | −46.723 d16 = 0.15 | | |
| r17 = | 859.297 d17 = 3.50 | n 9 = 1.83897 | ν 9 = 42.7 |
| r18 = | −45.988 d18 = Variable | | |
| r19 = | 72.837 d19 = 4.38 | n10 = 1.83897 | ν10 = 42.7 |
| r20 = | −72.530 d20 = 5.14 | | |
| r21 = | 0.000 d21 = 41.50 | n11 = 1.62528 | ν11 = 58.2 |
| r22 = | 0.000 | | |

| Variable Separation | Focal Length | | |
|---|---|---|---|
| | 28.70 | 31.30 | 34.15 |
| d 6 | 6.09 | 5.73 | 5.41 |
| d 8 | 1.18 | 0.89 | 0.50 |
| d11 | 3.14 | 5.69 | 8.20 |
| d13 | 8.58 | 6.04 | 3.55 |
| d18 | 0.50 | 1.13 | 1.83 |

Thus, the present embodiment provides a zoom lens system of five units or more including, in order from a more distant conjugate point for the zoom lens system, a first lens unit of a negative refractive power, a second lens unit of negative refractive power, and a third lens unit of a positive refractive power, properly arranging a diffraction optical element onto the predetermined lens unit, and setting moving and other conditions for respective units during zooming from a wide-angle end to a telephoto end. This structure may correct the chromatic aberration (in particular, the lateral chromatic aberration) and miniaturize the entire lens system. The zoom lens system according to the present invention is suitable for a projection lens to magnify and project a liquid crystal image etc. for use with a liquid crystal projector. According to the present invention, the aforementioned structure realizes a zoom lens system of a telecentric optical system having a zooming ratio of 1.2 or more, and maintains a large aperture having the F-number of about 2.0. In addition, the inventive zoom lens system may sufficiently correct various aberrations including the lateral chromatic aberration, maintain a back-focus space for optical elements, such as a color composite prism and various filters, and exhibit good performance throughout the entire zooming range and object length. The zoom lens system also provides a liquid crystal projector with a small lens span.

What is claimed is:

1. A zoom lens system comprising, in order from a more distant conjugate point for said zoom lens, a first lens unit of negative refractive power, a second lens unit of negative refractive power which moves during zooming, third, fourth and fifth lens units, wherein the nearest lens unit in said zoom lens system to more distant conjugate point is said first lens unit and separation between each lens unit varies during zooming, and said zoom lens system further comprises at least one diffraction optical element, wherein said diffraction optical element is made of stacked layers of diffraction gratings.

2. A zoom lens system according to claim 1, wherein said third lens unit has positive refractive power, said fourth lens unit has negative refractive power, and said fifth lens unit has positive refractive power.

3. A zoom lens system according to claim 1, further comprising a sixth lens unit, wherein said fifth lens unit moves during zooming.

4. A zoom lens system according to claim 1, further comprising a sixth lens unit of positive refractive power.

5. A zoom lens system according to claim 1, further comprising a stop movable during zooming.

6. A zoom lens system according to claim 5, wherein said stop moves with said third lens unit.

7. A zoom lens system according to claim 5, wherein said diffraction optical element is located closer to a less distant conjugate point than said stop.

8. A zoom lens system according to claim 1, further comprising a stop between said third and fourth lens units.

9. A zoom lens system according to claim 8, wherein said stop moves with said third lens unit.

10. A zoom lens system according to claim 8, wherein said diffraction optical element is located closer to a less distant conjugate point than said stop.

11. A zoom lens system according to claim 1, wherein said diffraction optical element is located in said fifth lens unit.

12. A zoom lens system according to claim 1, wherein a conditional expression $-0.50 < fw/f1 < -0.01$ is satisfied where f1 is a focal length of said first lens unit and fw is a focal length of an entire system of said zoom lens system at a wide-angle end.

13. A zoom lens system according to claim 1, wherein said fourth lens unit moves from the more distant conjugate point to a less distant conjugate point for said zoom lens system during zooming from a wide-angle end to a telephoto end.

14. A zoom lens system according to claim 1, wherein a conditional expression $0.05 < d3W/d3T < 0.60$ is satisfied where d3W is a separation between said third and fourth lens units at a wide-angle end and d3T is a separation between said third and fourth lens units at a telephoto end.

15. A zoom lens system according to claim 1, wherein said second lens unit moves from the more distant conjugate point to a less distant conjugate point for said zoom lens system during zooming from a wide-angle end to a telephoto end.

16. A zoom lens system according to claim 1, wherein a conditional expression $0.05 < |M2/M4| < 1.0$ is satisfied where M2 is a moving amount of said second lens unit during zooming from a wide-angle end to a telephoto end, and M4 is a moving amount of said fourth lens unit during zooming from the wide-angle end to the telephoto end.

17. A zoom lens system according to claim 1, wherein a conditional expression $0.01 < |M3/M4| < 1.0$ is satisfied where M3 is a moving amount of said third lens unit during zooming from a wide-angle end to a telephoto end, and M4 is a moving amount of said fourth lens unit during zooming from the wide-angle end to the telephoto end.

18. A zoom lens system according to claim 1, wherein said lens units at both ends in said zoom lens system do not move during zooming from a wide-angle end to a telephoto end.

19. A zoom lens system according to claim 1, wherein said second lens unit includes one positive lens and one negative lens.

20. A zoom lens system according to claim 1, wherein said second lens unit includes one negative lens.

21. A zoom lens system according to claim 1, wherein said third lens unit includes one positive lens.

22. A zoom lens system according to claim 1, wherein said fourth lens unit includes one negative lens.

23. A zoom lens system according to claim 1, wherein said first lens unit has three lenses including, in order from the more distant conjugate point, a positive lens, a negative lens and a negative lens.

24. A zoom lens system according to claim 1, wherein said first lens unit has three lenses including, in order from the more distant conjugate point, a positive lens, a positive lens and a negative lens.

25. A zoom lens system according to claim 1, wherein said diffraction optical element includes one diffraction grating.

26. A zoom lens system comprising, in order from a more distant conjugate point for said zoom lens system, a first lens unit of negative refractive power, a second lens unit of negative refractive power which moves during zooming, third, fourth, and fifth lens units, wherein the nearest lens unit in said zoom lens system to more distant conjugate point is said first lens unit and separation between each lens unit varies during zooming, and said zoom lens system further comprises at least one diffraction optical element, wherein said diffraction optical element is formed by combining two diffraction gratings having the same grating thickness and facing each other so as to make a flat a surface of said diffraction optical element.

27. A zoom lens system comprising, in order from a more distant conjugate point for said zoom lens system, a first lens unit of negative refractive power, a second lens unit of negative refractive power which moves during zooming, third, fourth and fifth lens units, wherein the nearest lens unit in said zoom lens system to more distant conjugate point is said first lens unit and separation between each lens unit varies during zooming, and said zoom lens system further comprises at least one diffraction optical element, wherein said diffraction optical element is formed by combining a plurality of diffraction gratings with each other.

28. A zoom lens system comprising, in order from a more distant conjugate point for said zoom lens system, a first lens unit of negative refractive power, a second lens unit of refractive power which moves during zooming, third, fourth and fifth lens units, wherein the nearest lens unit in said zoom lens system to more distant conjugate point is said first lens unit and separation between each lens unit varies during zooming, and said zoom lens system further comprises at least one diffraction optical element, wherein said diffraction optical element is formed by combining a plurality of diffraction gratings facing each other via air.

29. An image-projecting device comprising a zoom lens system that comprises, in order from a more distant conjugate point, a first lens unit of negative refractive power, a second lens unit of negative refractive power which moves during zooming, third, fourth and fifth lens units, wherein the nearest lens unit in said zoom lens system to more distant conjugate point is said first lens unit, and separation between each lens unit varies during zooming, and said zoom lens system further comprises at least one diffraction optical element, wherein said image-projecting device projects an original image to a subject surface located at a less distant conjugate position for said zoom lens system, wherein said diffraction optical element is made of stacked layers of diffraction gratings.

30. An image-projecting device according to claim 29, wherein said original image is formed by a liquid crystal panel.

31. An image pick-up device comprising a zoom lens system that comprises, in order from a more distant conjugate point, a first lens unit of a negative refractive power, a second lens unit of negative refractive power which moves during zooming, third, fourth and fifth lens units, wherein said zoom lens system further comprises at least one diffraction optical element, wherein said image pick-up device uses said zoom lens system to project an image of an object onto a photosensitive body located at a less distant conjugate position for said zoom lens system, wherein said diffraction optical element is made of stacked layers of diffraction gratings.

* * * * *